(12) United States Patent
Ishida et al.

(10) Patent No.: US 11,192,579 B2
(45) Date of Patent: Dec. 7, 2021

(54) ACTUATOR CONTROL DEVICE USED IN STEERING OF VEHICLE

(71) Applicant: NSK LTD., Tokyo (JP)

(72) Inventors: Tadashi Ishida, Maebashi (JP); Masahiro Maeda, Maebashi (JP); Atsushi Kojima, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/260,755

(22) PCT Filed: Jan. 10, 2020

(86) PCT No.: PCT/JP2020/000709
§ 371 (c)(1),
(2) Date: Jan. 15, 2021

(87) PCT Pub. No.: WO2020/158350
PCT Pub. Date: Aug. 6, 2020

(65) Prior Publication Data
US 2021/0245805 A1    Aug. 12, 2021

(30) Foreign Application Priority Data

Jan. 31, 2019   (JP) .............................. JP2019-015292

(51) Int. Cl.
*B62D 5/04*   (2006.01)
*B62D 6/00*   (2006.01)
*B62D 6/08*   (2006.01)

(52) U.S. Cl.
CPC ........... *B62D 6/002* (2013.01); *B62D 5/0463* (2013.01); *B62D 5/0484* (2013.01); *B62D 6/08* (2013.01)

(58) Field of Classification Search
CPC .... B62D 6/002; B62D 5/0463; B62D 5/0484; B62D 6/08
See application file for complete search history.

(56) References Cited

U.S. PATENT DOCUMENTS 5,236,335 A * 8/1993 Takeuchi ............... B62D 5/001
                                                       180/404
7,630,807 B2 * 12/2009 Yoshimura ............ B60W 10/10
                                                       701/48

(Continued)

FOREIGN PATENT DOCUMENTS

JP    2006-264405 A  * 10/2006
JP    2010-188917 A    9/2010

(Continued)

OTHER PUBLICATIONS

"Research of Automotive Steer-by-Wire Control Based on Integral Partition PID Control;" Xiuwei Fu, Li Fu, Feng Kong; 2009 Third International Conference on Genetic and Evolutionary Computing (pp. 561-564); Mar. 12, 2010.*

(Continued)

*Primary Examiner* — Khoi H Tran
*Assistant Examiner* — Jorge O Peche
(74) *Attorney, Agent, or Firm* — Sughrue Mion, PLLC

(57) ABSTRACT

An actuator control device includes: a turning control value calculation unit configured to calculate a turning control value that controls an actuator configured to turn a steered wheel on a basis of an operation state amount by a driver with respect to a steering mechanism of the vehicle; a target value setting unit configured to set a target value of a state amount indicating a traveling direction of the vehicle on a basis of a surrounding environment of the vehicle; a target value control unit configured to control the actuator by integral control so that actual the state amount approaches the target value; and an integral suppression unit configured to suppress an increase in a first integral value calculated in the integral control according to a second integral value calculated according to the operation state amount.

10 Claims, 18 Drawing Sheets

(56) References Cited

U.S. PATENT DOCUMENTS

| | | | | |
|---|---|---|---|---|
| 8,645,022 | B2* | 2/2014 | Yoshimura | B60W 50/0225 701/32.8 |
| 9,174,668 | B2* | 11/2015 | Kichise | B62D 5/0496 |
| 9,650,038 | B2* | 5/2017 | Yoshimura | B60W 10/20 |
| 2006/0015231 | A1* | 1/2006 | Yoshimura | B60T 7/12 701/48 |
| 2009/0024278 | A1* | 1/2009 | Kondo | B62D 6/002 701/41 |
| 2010/0030421 | A1* | 2/2010 | Yoshimura | B60W 10/10 701/31.4 |
| 2011/0036660 | A1* | 2/2011 | Kojo | B62D 5/0481 180/446 |
| 2011/0040446 | A1* | 2/2011 | Taguchi | B62D 15/025 701/41 |
| 2012/0215406 | A1* | 8/2012 | Tanimoto | B62D 6/002 701/42 |
| 2013/0066521 | A1* | 3/2013 | Watanabe | B62D 6/002 701/41 |
| 2013/0096778 | A1* | 4/2013 | Goto | B62D 6/002 701/41 |
| 2013/0144493 | A1* | 6/2013 | Hayama | B62D 5/001 701/43 |
| 2014/0188343 | A1* | 7/2014 | Yoshimura | B60W 30/00 701/41 |
| 2014/0277944 | A1* | 9/2014 | Bean | B62D 6/002 701/41 |
| 2015/0057892 | A1* | 2/2015 | Tamaizumi | B62D 6/10 701/42 |
| 2015/0100207 | A1* | 4/2015 | Yoshimura | B60L 15/2009 701/41 |
| 2015/0291210 | A1* | 10/2015 | Kageyama | B62D 5/04 701/41 |
| 2016/0016606 | A1* | 1/2016 | Tsubaki | B62D 5/0472 701/41 |
| 2016/0075373 | A1* | 3/2016 | Fukukawa | B62D 15/021 701/42 |
| 2016/0288830 | A1* | 10/2016 | Hori | B62D 15/025 |
| 2017/0073003 | A1* | 3/2017 | Shepard | B62D 13/06 |
| 2017/0106900 | A1* | 4/2017 | Sakai | B62D 5/0427 |
| 2017/0210414 | A1* | 7/2017 | Sato | B62D 6/003 |
| 2018/0022354 | A1* | 1/2018 | Akatsuka | B60W 10/04 701/41 |
| 2018/0037256 | A1* | 2/2018 | Maeda | B62D 15/025 |
| 2018/0065657 | A1* | 3/2018 | Hirate | B62D 5/0481 |
| 2018/0170424 | A1* | 6/2018 | Tatsukawa | B62D 6/00 |
| 2018/0178834 | A1* | 6/2018 | Moreillon | B62D 1/286 |
| 2018/0186406 | A1* | 7/2018 | Itou | B62D 6/005 |
| 2018/0201307 | A1* | 7/2018 | Kudo | B62D 1/28 |
| 2019/0002019 | A1* | 1/2019 | Tsubaki | B62D 5/0472 |
| 2019/0023319 | A1* | 1/2019 | Tyrrell | B62D 15/025 |
| 2019/0039647 | A1* | 2/2019 | Tsubaki | B62D 15/025 |
| 2019/0161116 | A1* | 5/2019 | Moreillon | B62D 1/286 |
| 2019/0193776 | A1* | 6/2019 | Tsubaki | B62D 6/04 |
| 2019/0210598 | A1* | 7/2019 | Endo | G08G 1/166 |
| 2019/0225260 | A1* | 7/2019 | Tsubaki | B62D 15/0235 |
| 2019/0300044 | A1* | 10/2019 | Tsubaki | B62D 6/007 |
| 2020/0039576 | A1* | 2/2020 | Shoji | B62D 6/003 |
| 2020/0385053 | A1* | 12/2020 | Mine | B60W 60/0013 |
| 2021/0039709 | A1* | 2/2021 | Miura | B62D 6/002 |
| 2021/0053617 | A1* | 2/2021 | Miura | B62D 6/002 |
| 2021/0129838 | A1* | 5/2021 | Hulten | B62D 5/046 |
| 2021/0245805 | A1* | 8/2021 | Ishida | B62D 6/002 |

FOREIGN PATENT DOCUMENTS

| | | |
|---|---|---|
| JP | 2015-033942 A | 2/2015 |
| JP | 2018-052271 A | 4/2018 |
| JP | 6729155 B2 * | 7/2020 |
| JP | WO2020/158350 A1 * | 2/2021 |

OTHER PUBLICATIONS

"Modification of vehicle handling characteristics via steer-by-wire;" P. Yih, J.C. Gerdes; IEEE Transactions on Control Systems Technology (vol. 13, Issue: 6, pp. 965-976); Nov. 1, 2005.*

"Modular Integrated Longitudinal, Lateral, and Vertical Vehicle Stability Control for Distributed Electric Vehicles;" Haiyan Zhao, Weixuan Chen, Jinyang Zhao, Yilin Zhang, Hong Chen; IEEE Transactions on Vehicular Technology (vol. 68, Issue: 2, pp. 1327-1338); Feb. 1, 2019.*

International Search Report for PCT/JP2020/000709 dated Mar. 24, 2020 (PCT/ISA/210).

Written Opinion of the International Searching Authority for PCT/JP2020/000709 dated Mar. 24, 2020 (PCT/ISA/223).

International Preliminary Report on Patentability dated Jul. 27, 2021 in International Application No. PCT/JP2020/000709.

* cited by examiner

ACTUATOR CONTROL DEVICE USED IN STEERING OF VEHICLE

CROSS REFERENCE TO RELATED APPLICATIONS

This application is a National Stage of International Application No. PCT/JP2020/00709 filed Jan. 10, 2020, claiming priority based on Japanese Patent Application No. 2019-015292 filed Jan. 31, 2019.

TECHNICAL FIELD

The present invention relates to an actuator control device used in steering of a vehicle.

BACKGROUND ART

An electric power steering device described in PTL 1 below is known as an automatic steering technology of a vehicle. The electric power steering device includes a damping control unit that proportionally differentiates a steering torque to calculate a correction current command value 2, a position control unit that receives a steering angle deviation between a target steering angle and an actual steering angle, an integration unit that receives a deviation between a motor speed command value from the position control unit and a motor angular velocity, a proportional unit that receives the motor angular velocity, and a speed control unit that subtracts an output of the proportional unit from an output of the integration unit to output a correction current command value 1, in which the correction current command value 1 and the correction current command value 2 are added to calculate a motor current command value for automatic steering.

Additionally, an actuator control device described in PTL 2 below includes an assistance control unit that calculates a first assistance component Ta1* and an automatic steering control unit that, while a steering torque is below a threshold value B, calculates a second assistance component Ta2* by PID control using an integral term obtained on the basis of an angle deviation, in which the automatic steering control unit limits the integral term so that the integral term is hard to increase while the steering torque is a threshold value A or above and below the threshold value B as compared with while the steering torque is below threshold value A.

CITATION LIST

Patent Literature

PTL 1: JP Pat. No. 5915811
PTL 2: JP 2018-024281 A

SUMMARY OF INVENTION

Technical Problem

The electric power steering device of PTL 1 above generates a control value in a direction opposite to steering of a driver when a steering angle deviation occurs due to the steering of the driver. This can cause a change in a steering feeling of the driver and make the driver feel uncomfortable.

In addition, the actuator control device of PTL 2 above generates the second assistance component Ta2* by integral control according to the angle deviation when the driver holds the steering wheel with a steering torque equal to or more than the threshold value A and below the threshold value B. Therefore, steering reaction force increasing over time can cause a change in the steering feeling of the driver and make the driver feel uncomfortable.

Additionally, when the driver holds the steering wheel with a steering torque equal to or more than the threshold value B, the second assistance component Ta2* is not generated and there is no discomfort. However, when the steering torque drops below the threshold value B, the angle deviation at the point in time is integrated, so that the second assistance component Ta2* suddenly changes, and sudden steering control may cause the driver to lose control of the steering wheel.

The present invention has been made in view of the above problems, and it is art object of the present invention to suppress a change in the steering feeling of a driver due to automatic steering control caused by steering operation of the driver.

Solution to Problem

To achieve the above object, according to an aspect of the present invention, there is provided an actuator control device for use in steering of a vehicle, the actuator control device including: a turning control value calculation unit configured to calculate a turning control value that controls an actuator configured to turn a steered wheel on a basis of an operation state amount by a driver with respect to a steering mechanism of the vehicle; a target value setting unit configured to set a target value of a state amount indicating a traveling direction of the vehicle on a basis of a surrounding environment of the vehicle; a target value control unit configured to control the actuator by integral control so that actual the state amount approaches the target value; and an integral suppression unit configured to suppress an increase in a first integral value calculated in the integral control according to a second integral value calculated according to the operation state amount.

For example, the target value control unit may include an integral control unit configured to integrate a deviation between the actual the state amount and the target value to calculate the first integral value, and control the actuator by the integral control according to the first integral value.

For example, the target value control unit may include a target change speed calculation unit configured to calculate a target change speed of the state amount on a basis of a difference between the actual the state amount and the target value and an integral control unit configured to integrate a deviation between a change speed of the actual the state amount and the target change speed to calculate the first integral value, and control the actuator by the integral control according to the first integral value.

Advantageous Effects of Invention

According to the present invention, it is possible to suppress a change in the steering feeling of a driver due to automatic steering control caused by steering operation of the driver.

DESCRIPTION OF EMBODIMENTS

Embodiments of the present invention will be described in detail with reference to the drawings.

It should be noted that the embodiments given below are those exemplifying devices and methods for embodying the technological ideas of the present invention, and the technological ideas of the present invention do not limit the structures, arrangement, and the like of components to those described below. The technological ideas of the present invention can be variously modified within the technological scope defined by the claims described in CLAIMS.

First Embodiment

Figure 1:
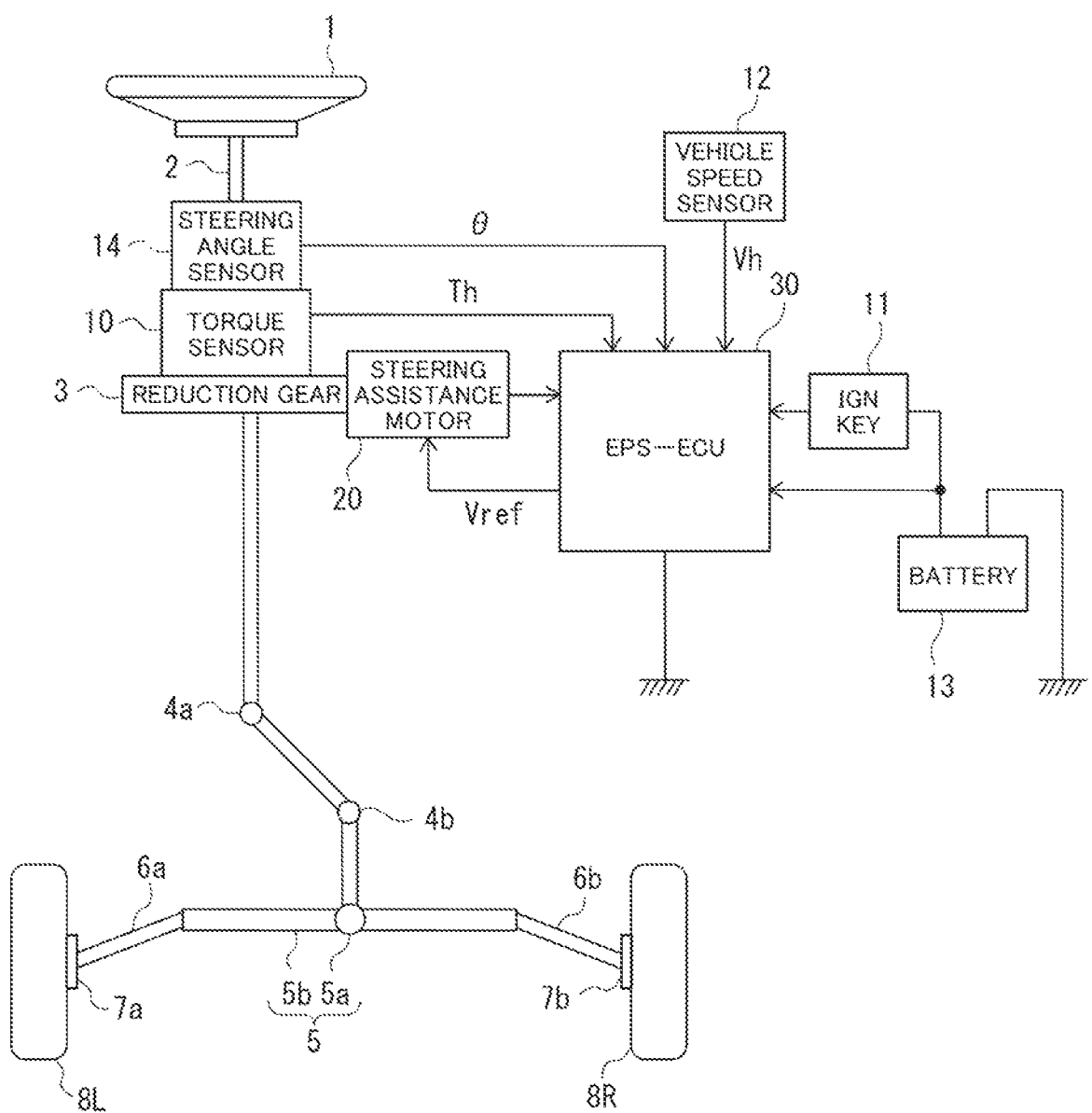
FIG. 1 is a structural diagram illustrating an outline of an example of an electric power steering device of first and second embodiments.

FIG. 1 illustrates a structural example of an electric power steering device of first and second embodiments. A steering shaft (steering wheel shaft) 2 of a steering wheel 1 is connected to steered wheels 8L and FR through a reduction gear (worm gear) 3 constituting a speed reduction mechanism, universal joints 4a and 4b, a pinion rack mechanism 5, and tie rods 6a and 6b, and furthermore via hub units 7a and 7b.

The pinion rack mechanism 5 includes a pinion 5a connected to a pinion shaft to which steering force is transmitted from the universal joint 4b and a rack 5b engaged with the pinion 5a, and converts a rotational motion transmitted to the pinion 5a into a linear motion in a vehicle width direction by the rack 5b.

The steering shaft 2 is provided with a torque sensor 10 that detects a steering torque Th. Additionally, the steering shaft 2 is provided with a steering angle sensor 14 that detects a steering angle θ of the steering wheel 1.

Additionally, a steering assistance motor 20 that assists steering force of the steering wheel 1 is connected to the steering shaft 2 via the reduction gear 3. Electric power from a battery 13 is supplied to an electronic control unit (EPS-ECU) 30 that is a controller for controlling the electric power steering (EPS) device, and an ignition key signal is input to the EPS-ECU 30 through an ignition (IGN) key 11.

Note that means for applying the steering assistance force is not limited to the motor, and various kinds of actuators can be used.

The EPS-ECU 30 calculates a current command value of an assistance control command on the basis of the steering torque Th detected by the torque sensor 10, a vehicle speed Vh detected by a vehicle sensor 12, and the steering angle θ detected by the steering angle sensor 14, and controls current supplied to the steering assistance motor 20 by a voltage control command value Vref obtained by subjecting the calculated current command value to compensation or the like.

Note that the steering angle sensor 14 is not essential, and the steering angle θ may be acquired from a rotation angle sensor such as a resolver connected to the steering assistance motor 20.

The EPS-ECU 30 may include, for example, a computer including a processor and peripheral components such as a storage device. The processor may be, for example, a central processing unit (CPU) or a micro-processing unit (MPU).

The storage device may include any of a semiconductor storage device, a magnetic storage device, and an optical storage device. The storage device may include memories, such as register, cache memory, and read only memory (ROM) and random access memory (RAM) used as primary storage.

Functions of the EPS-ECU 30 that will be described below are realized by, for example, causing the processor of the EPS-ECU 30 to execute a computer program stored in the storage device.

Note that the EPS-ECU 30 may be formed by dedicated hardware for executing each information processing that will be described below.

For example, the EPS-ECU 30 may include a functional logic circuit set in a general-purpose semiconductor integrated circuit. For example, the EPS-ECU 30 may include a programmable logic device (PLD) such as a field-programmable gate array (FPGA), or the like.

An example of a functional structure of the EPS-ECU 30 of the first embodiment will be described with reference to FIG. 2. The EPS-ECU 30 includes a command value calculation unit 31, a subtractor 32, a proportional-integral (PI) control unit 33, a pulse width modulation (PWM) control unit 34, and an inverter (INV) 35.

The command value calculation unit 31 calculates a current command value Iref that is a control target value of a drive current for the steering assistance motor 20 on the basis of a target steering angle θr set by a travel control ECU 37, the steering angle θ, the steering torque Th, and the vehicle speed Vh.

The travel control ECU 37 includes a target trajectory calculation unit 38 and a steering command value calculation unit 39. The target trajectory calculation unit 38 calculates a target trajectory for causing a vehicle to travel on the basis of a surrounding environment of the vehicle and a traveling state of the vehicle detected by a state detection unit 36.

The state detection unit 36 may include a distance measuring device and a camera for detecting the surrounding environment of the vehicle and an angular velocity sensor, an acceleration sensor, and the like for detecting the traveling state of the vehicle.

The steering command value calculation unit 39 calculates the target steering angle θr that is a control target value of the steering angle θ on the basis of the target trajectory calculated by the target trajectory calculation unit 38 and a result of the detection by the state detection unit 36, and outputs to the EPS-ECU 30.

The current command value. Iref calculated by the command value calculation unit 31 is input to the subtractor 32 in which a deviation (Iref−Im) from a fed-back motor current value Im is calculated. The deviation (Iref−Im) is input to the PI control unit 33 for improving characteristics of steering operation.

A steering assistance command value Vref obtained by the characteristic improvement by the PT control unit 33 is input to the PWM control unit 34, and furthermore, the steering assistance motor 20 is PWM-driven via the inverter 35 as a drive unit. The current value Im of the steering assistance motor 20 is detected by the motor current detector 21 and fed back to the subtractor 32. The inverter 35 uses a field effect transistor (FET) as a drive element, and is formed by a FET bridge circuit.

Next, a functional structure of the command value calculation unit 31 will be described with reference to FIG. 3. The command value calculation unit 31 calculates a first assistance control value C1 for controlling the steering assistance motor 20 on the basis of an operation state amount that changes depending on operation by the driver with respect to a steering mechanism.

The command value calculation unit 31 also calculates a second assistance control value C2 for controlling the steering assistance motor 20 so that the actual steering angle θ approaches the target steering angle θr.

The command value calculation unit 31 includes a first assistance control value calculation unit 40 that calculates the first assistant control value C1 on the basis of the steering torque Th and the vehicle speed Vh, a subtractor 41 that calculates a deviation Δθ (=θr−θ) by subtracting the actual steering angle θ from the target steering angle θr, a proportionator 45, an integrator 46, and an adder 47. The second assistance control value C2 is calculated by PI control based on the deviation Δθ using the proportionator 45, the integrator 46, and the adder 47. The subtractor 41, the proportionator 45, the integrator 46, and the adder 47 are an example of "target value control unit" described in the claims.

The command value calculation unit 31 further includes an adder 46 that calculates a sum of the first assistance control value C1 and the second assistance control value C2 as the current command value Iref, and calculates the current command value Iref on the basis of at least one of the first assistance control value C1 and the second assistance control value C2.

If the current command value Iref is calculated on the basis of the second assistance control value C2 generated by PI control based on the deviation Δθ, the current command value Iref in a direction hindering steering of the driver is generated when the deviation Δθ is generated by steering of the driver, making steering of the driver difficult.

In addition, if the deviation Δθ is maintained by the holding of the steering wheel by the driver, continuous integration of the deviation Δθ increases the second assistance control value C2, and steering reaction force increases over time, which creates a discomfort.

These problems can be solved by stopping the integration of the deviation Δθ depending on a magnitude of the operation state amount (for example, the steering torque Th) as is by the driver with respect to the steering mechanism.

However, when after stopping the integration due to an increased operation state amount, the operation state amount decreases and the integration stop is lifted, the deviation Δθ at the point in time is integrated, so that the second assistance control value C2 may suddenly change, and sudden steering control may cause the driver to lose control of the steering wheel.

Thus, the command value calculation unit 31 of the first embodiment calculates an integral value of a value corresponding to the operation state amount, and, according to the integral value, suppresses an increase in an integral value of the deviation Δθ calculated by the integrator 46. Note that the integral value of the deviation Δθ calculated by the integrator 46 is an example of "first integral value" described in the claims, and the integral value of the value corresponding to the operation state amount is an example of "second integral value" described in the claims.

By suppressing the increase in the integral value of the deviation Δθ according to the integral value of the value corresponding to the operation state amount, a change in the second assistance control value C2 in a direction opposite to a direction of steering by the driver is suppressed when the operation state amount by the driver is large and the driver has a strong intention of steering, thus enabling suppression of a change in the steering feeling of the driver.

Additionally, by suppressing according to the integral value of the value corresponding to the operation state amount instead of the operation state amount as is, the integral value of the deviation Δθ is suppressed according to a duration during which steering holding continues even in a state such as a steering holding state where the operation state amount does not change, so that change in the steering feeling of the driver due to the increased second assistance control value C2 can be suppressed.

In addition, even when lifting the suppression of the increase in the first integral value due to a decrease in the operation state amount, the integral value of the value corresponding to the operation state amount changes more slowly than the operation state amount as is, so that a sudden change in the second assistance control value C2 can be prevented.

The command value calculation unit 31 includes an integral suppression variable calculation unit 42, an input limiter 43, and a sign inverter 44. As an example of the operation state amount by the driver with respect to the steering mechanism, the steering torque Th is input to the integral suppression variable calculation unit 42. Note that the operation state amount is not limited to the steering torque Th, and, for example, may be the steering angle θ or a turning angle of the steered wheels 8L and SR.

The integral suppression variable calculation unit 42 integrates a value that changes according to the steering torque Th to calculate an integral suppression variable for suppressing an increase in the integral value of the deviation Δθ by the integrator 46.

The integral suppression variable is an example of "second integral value" described in the claims. The integral suppression variable calculation unit 42 calculates an input limit value Li and a gradually decreasing gain Gd as the integral suppression variable.

The input limit value Li represents an upper limit value and a lower limit value with respect to the deviation Δθ input to the integrator 46, and limits the magnitude of the deviation Δθ input to the integrator 46. Therefore, the smaller the input limit value Li, the more suppressed the increase in the integral value, whereas the larger the input limit value Li, the more relaxed the suppression of the increase in the integral value.

The gradually decreasing gain Gd is a gain that changes a result of integration by the integrator 46 to suppress an increase in the integral value of the deviation Δθ. For example, the gradually decreasing gain Gd may be a gain that is multiplied by the result of integration by the integrator 46. In this case, the smaller the gradually decreasing gain Gd, the more suppressed the increase in the integral value, whereas the larger the gradually decreasing gain Gd, the more relaxed the suppression of the increase in the integral value.

Figure 4:
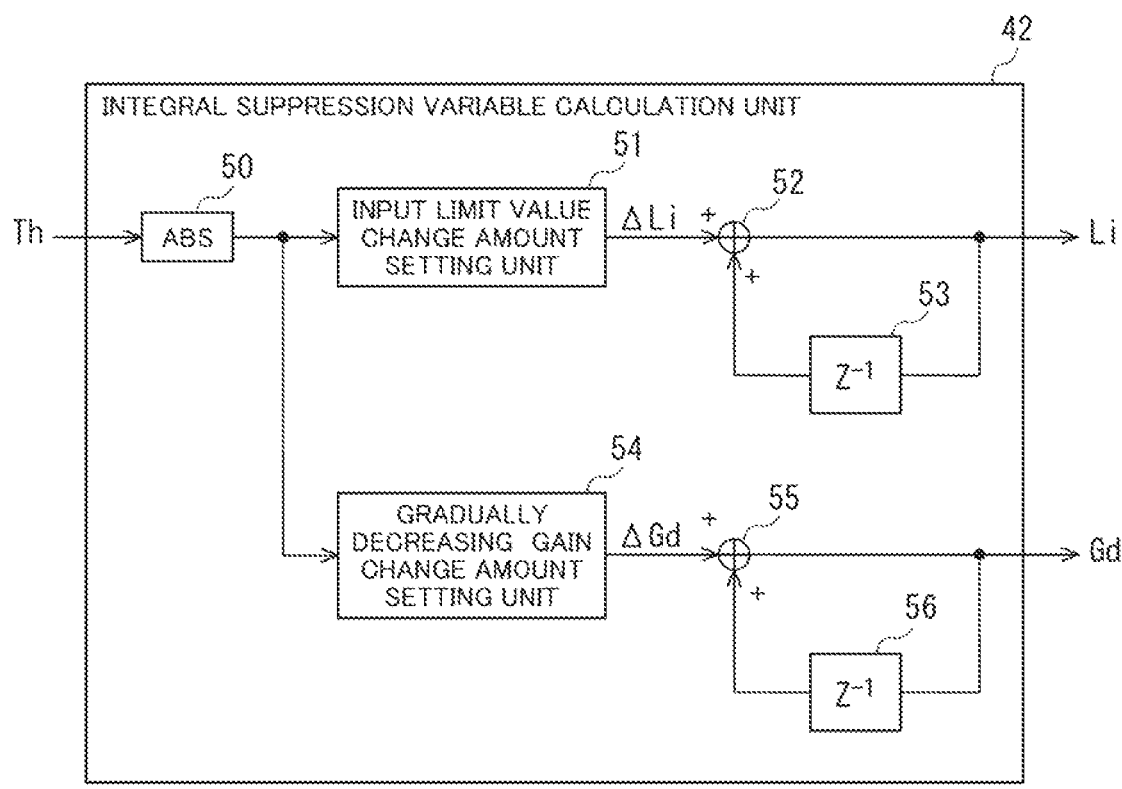
FIG. 4 is a block diagram illustrating an example of a functional structure of an integral suppression variable calculation unit.

Reference will be made to FIG. 4. The integral suppression variable calculation unit 42 includes an absolute value calculation unit (ABS) 50, an input limit value change amount setting unit 51, adders 52 and 55, past value holding units (delay processing units) 53 and 56, and a gradually decreasing gain change amount setting unit 54.

The absolute value calculation unit 50 calculates an absolute value |Th| of the steering torque Th and inputs to the input limit value change amount setting unit 51 and the gradually decreasing gain change amount setting unit 54.

The input limit value change amount setting unit 51 sets an input limit value change amount ΔLi that changes according to a change in the absolute value |Th| of the steering torque. The input limit value change amount ΔLi is an example of "a variable that changes according to an operation state amount" described in the claims.

The input limit value change amount ΔLi is input to the adder 52. The adder 52 adds the input limit value Li held in an immediately preceding cycle (one cycle before) through the past value holding unit 53 and the input limit value change amount ΔLi to integrate the input limit value change amount ΔLi, and calculates a result of the integration as the input limit value Li.

Figure 5A:
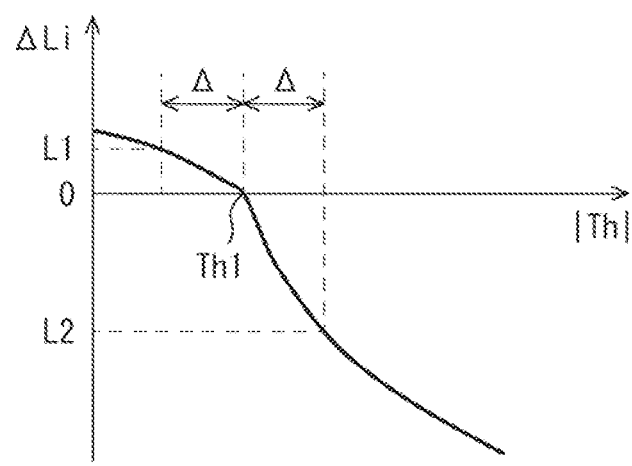
FIG. 5A is a characteristic diagram illustrating an example of characteristics of an input limit value change amount ΔLi according to a steering torque Th.

FIG. 5A illustrates a characteristic example of the input limit value change amount ΔLi according to the absolute value |Th| of the steering torque set by the input limit value change amount setting unit 51.

The input limit value change amount ΔLi has a positive value in a range where the absolute value |Th| of the steering torque is below a threshold value Th1, whereas it has a negative value in a range where the absolute value |Th| thereof is equal to or more than the threshold value Th1.

As a result, when the absolute value |Th| of the steering torque is below the threshold value Th1 (when the |Th| is relatively small), the input limit value Li increases, which relaxes suppression of the increase in the integral value of the deviation Δθ by the integrator 46.

Additionally, when the absolute value |Th| of the steering torque is equal to or more than the threshold value Th1 (when the |Th| is relatively large), the input limit value Li decreases, which further suppresses the increase in the integral value of the deviation Δθ by the integrator 46.

The threshold value Th1 may be set to a value larger than a steering torque by which the driver is determined to have no intention of steering (for example, a steering torque applied when simply touching the steering wheel 1). This can prevent the second assistance control value C2 from being excessively suppressed.

The larger the absolute value |Th| of the steering torque, the smaller the input limit value change amount ΔLi may be set. For example, in a range where the absolute value |Th| of the steering torque is equal to or more than the threshold value Th1 and the input limit value change amount ΔLi has a negative value, an absolute value of the input limit value change amount ΔLi may be set larger as the absolute value |Th| of the steering torque is larger. As a result, the input limit value Li can be quickly changed when the driver has a strong intention of steering, and the second assistance control value C2 can be adjusted according to the intention of steering.

Furthermore, the input limit value change amount ΔLi may be set so that a rate of change in the input limit value change amount ΔLi with respect to change in the absolute value |Th| of the steering torque equal or more than the threshold value Th1 is larger than the rate of change when the absolute value |Th| is below the threshold value Th1.

For example, the input limit value change amount ΔLi may be set so that an absolute value of an input limit value change amount L2 set with respect to a steering torque equal to a sum (Th1+Δ) of the threshold value Th1 and any value Δ is larger than an absolute value of an input limit value change amount L1 set with respect to a steering torque equal to a difference (Th1−Δ) obtained by subtracting the same value Δ from the threshold value Th1. Additionally, when comparing two areas set by an axis representing the absolute value of the steering torque, the threshold value Th1, and a characteristic line of the input limit value change amount ΔLi, the area on an origin side from the threshold value Th1 may be set smaller than the other area.

As a result, when the driver has a strong intention of steering, the input limit value Li can be quickly changed, and the second assistance control value C2 can be adjusted according to the intention of steering.

On the other hand, change in the input limit value Li can be slowed down when the driver has no (or less) intention of steering and suppression of the increase in the integral value of the deviation Δθ is relaxed. This can slow down change in the second assistance control value C2 even when the deviation Δθ is large, so that a sudden change in the steering feeling of the driver can be prevented.

Reference will be made to FIG. 4. The gradually decreasing gain change amount setting unit 54 sets a gradually decreasing gain change amount ΔGd that changes according to a change in the absolute value |Th| of the steering torque. The gradually decreasing gain change amount ΔGd is an example of "a variable that changes according to the operation state amount" described in the claims.

The gradually decreasing gain change amount ΔGd is input to the adder 55. The adder 55 adds the gradually decreasing gain Gd held in an immediately preceding cycle (one cycle before) through the past value holding unit 56 and the gradually decreasing gain change amount ΔGd to integrate the gradually decreasing gain change amount ΔGd, and calculates a result of the integration as the gradually decreasing gain Gd.

Figure 5B:
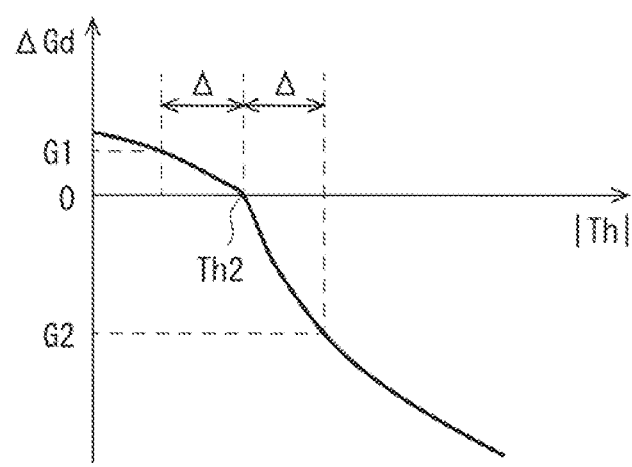
FIG. 5B is a characteristic diagram illustrating an example of characteristics of a gradually decreasing gain change amount ΔGd according to the steering torque Th.

FIG. 5B illustrates a characteristic example of the gradually decreasing gain change amount ΔGd according to the absolute value |Th| of the steering torque set by the gradually decreasing gain change amount setting unit 54.

The gradually decreasing gain change amount ΔGd has a positive value in a range where the absolute value |Th| of the steering torque is below a threshold value Th2, whereas it has a negative value in a range where the absolute value |Th| thereof is equal to or more than the threshold value Th2.

As a result, when the absolute value |Th| of the steering torque is below the threshold value Th2 (when the |Th| is relatively small), the gradually decreasing gain change amount ΔGd increases, which relaxes suppression of the increase in the integral value of the deviation Δθ by the integrator 46. The threshold value Th2 may be the same as or different from the threshold value Th1.

Additionally, when the absolute value |Th| of the steering torque is equal to or more than the threshold value Th2 (when the |Th| is relatively large), the gradually decreasing gain change amount ΔGd decreases, which further suppresses the increase in the integral value of the deviation Δθ by the integrator 46.

The threshold value Th2 may be set to a value larger than a steering torque by which the driver is determined to have no intention of steering (for example, a steering torque applied when simply touching the steering wheel 1). This can prevent the second assistance control value C2 from being excessively suppressed.

The larger the absolute value |Th| of the steering torque, the smaller the gradually decreasing gain change amount ΔGd may be set. For example, in a range where the absolute value |Th| of the steering torque is equal to or more than the threshold value Th2 and the gradually decreasing gain change amount ΔGd has a negative value, an absolute value of the gradually decreasing gain change amount ΔGd may be set larger as the absolute value |Th| of the steering torque is larger. As a result, when the driver has a strong intention of steering, the gradually decreasing gain Gd can be quickly changed, and the second assistance control value C2 can be adjusted according to the intention of steering.

Furthermore, the gradually decreasing gain change amount ΔGd may be set so that a rate of change in the gradually decreasing gain change amount ΔGd with respect to change in the absolute value |Th| of the steering torque equal or more than the threshold value Th2 is larger than the rate of change when the absolute value |Th| is below the threshold value Th2.

For example, the gradually decreasing gain change amount ΔGd may be set so that an absolute value of a gradually decreasing gain change amount G2 set with respect to a steering torque equal to a sum (Th2+Δ) of the threshold value Th2 and any value Δ is larger than an absolute value of a gradually decreasing gain G1 set with respect to a steering torque equal to a difference (Th2−Δ) obtained by subtracting the same value Δ from the threshold value Th2. Additionally, when comparing two areas set by an axis representing the absolute value of the steering torque, the threshold value Th2, and a characteristic line of the gradually decreasing gain change amount ΔGd, the area on an origin side from the threshold value Th2 may be set smaller than the other area.

As a result, when the driver has a strong intention of steering, the gradually decreasing gain Gd can be quickly changed, and the second assistance control value C2 can be adjusted according to the intention of steering.

On the other hand, change in the gradually decreasing gain Gd can be slowed down when the driver has no (or less) intention of steering and suppression of the increase in the integral value of the deviation Δθ is relaxed. This can slow down change in the second assistance control value C2 even when the deviation Δθ is large, so that a sudden change in the steering feeling of the driver can be prevented.

Figure 3:
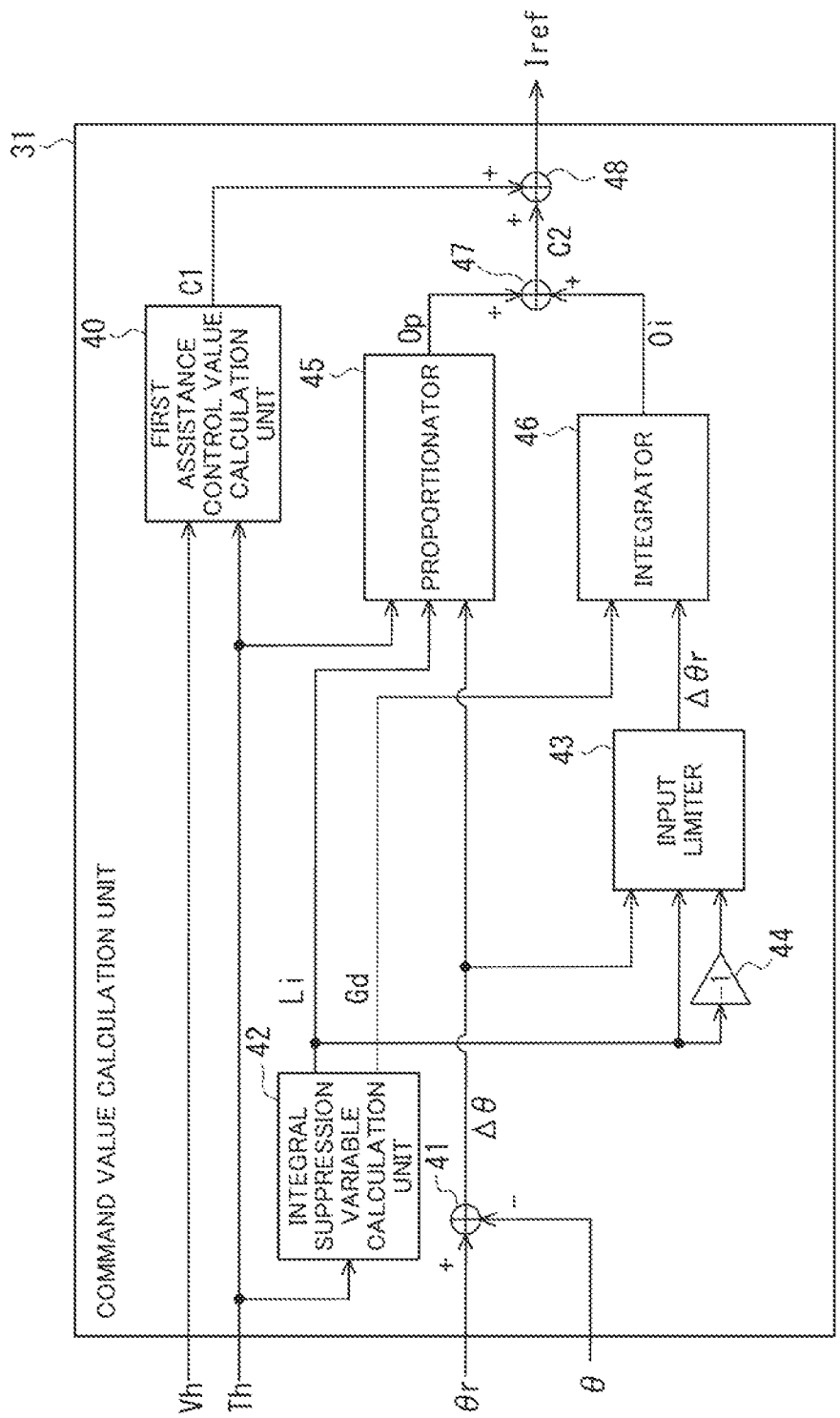
FIG. 3 is a block diagram illustrating an example of a functional structure of a command value calculation unit of the first embodiment.

Reference will be made to FIG. 3. The integral suppression variable calculation unit 42 outputs the input limit value Li to the proportionator 45, the input limiter 43, and the sign inverter 44. The sign inverter 44 outputs a value (−Li) obtained by inverting a sign of the input limit value Li to the input limiter 43.

The input limiter 43 inputs a post-limitation deviation Δθr obtained by limiting the deviation Δθ to be input to the integrator 46 according to the input limit values Li and (−Li) to the integrator 46.

Figure 6:
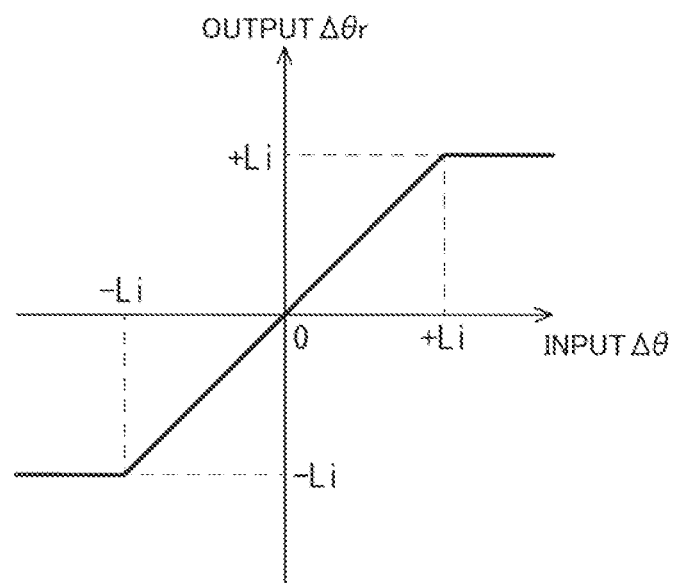
FIG. 6 is a characteristic diagram illustrating an example of input/output characteristics of an input limiter.

FIG. 6 illustrates an example of input/output characteristics of the input limiter 43. When the input deviation Δθ is equal to or more than the lower limit value (−Li) and equal to or less than the upper limit value Li, the post-limitation deviation Δθr is equal to the deviation Δθ.

When the deviation Δθ is below the lower limit value (−Li), the post-limitation deviation Δθr is maintained at the lower limit value (−Li). When the deviation Δθ is more than the upper limit value Li, the post-limitation deviation Δθr is maintained at the upper limit value Li.

In this way, the absolute value calculation unit 50, the input limit value change amount setting unit 51, the adder 52, the past value holding unit 53, the input limiter 43, and the sign inverter 44 limit the deviation Δθ integrated in calculation of the integral value of the deviation Δθ according to the input limit value Li.

The absolute value calculation unit 50, the input limit value change amount setting unit 51, the adder 52, the past value holding unit 53, the input limiter 43, and the sign inverter 44 are an example of "integral suppression unit" described in the claims.

Reference will be made to FIG. 3. The steering torque Th, the deviation Δθ, and the input limit value Li are input to the proportionator 45. The proportionator 45 multiplies a proportional gain Gp corresponding to the steering torque Th by the deviation Δθ to calculate a proportional component Op of the PI control in the command value calculation unit 31.

Additionally, the proportionator 45 changes the proportional component Op according to the input limit value Li. For example, the proportionator 45 increases the proportional component Op as the input limit value Li decreases.

As a result, the proportional component Op increases when the input limit value Li is small and the magnitude of the deviation Δθ input to the integrator 46 is limited. Accordingly, in a scene where the magnitude of the deviation Δθ input to the integrator 46 is limited, i.e., in a scene where change in the second assistance control value C2 is suppressed and steering by the driver is prioritized, the proportional component Op is increased, thereby enabling improvement in followability to the target steering angle.

Figure 7:
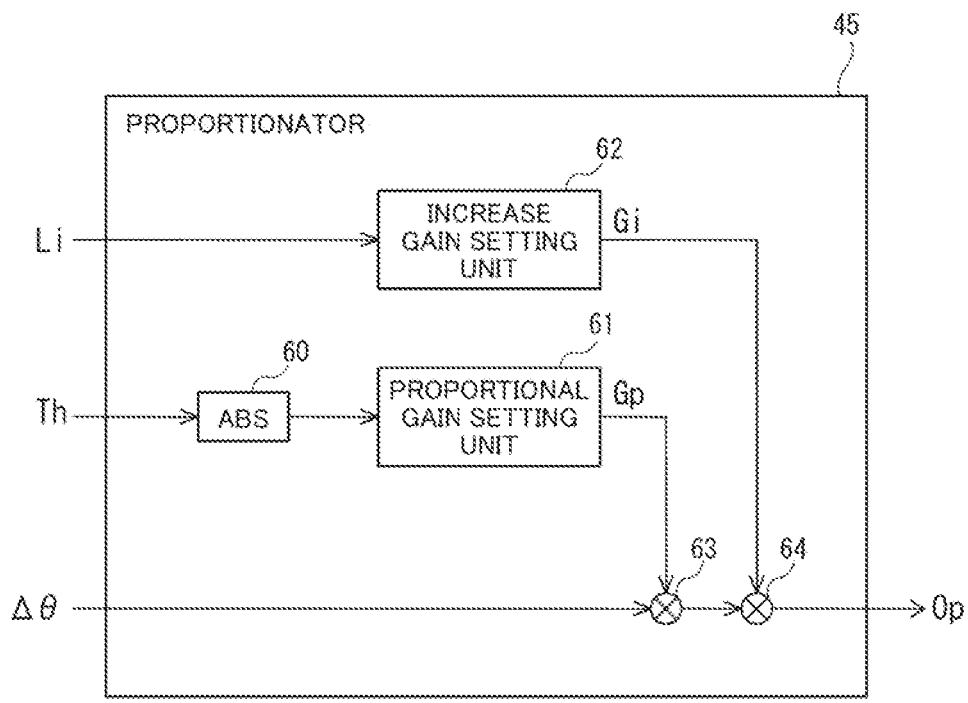
FIG. 7 is a block diagram illustrating an example of a functional structure of a proportionator.

Reference will be made to FIG. 7. The proportionator 45 includes an absolute value calculation unit 60 (ABS), a proportional gain setting unit 61, an increase gain setting unit 62, and multipliers 63 and 64.

The absolute value calculation unit 60 calculates the absolute value |Th| of the steering torque Th and inputs to the proportional gain setting unit 61. The proportional gain setting unit 61 calculates the proportional gain Gp according to the absolute value |Th| of the steering torque.

In addition, the increase gain setting unit 62 calculates an increase gain Gi according to the input limit value Li. The multipliers 63 and 64 multiply the proportional gain Gp and the increase gain Gi, respectively, by the deviation $\Delta\theta$ of the steering angle to calculate the proportional component Op.

Figure 8:
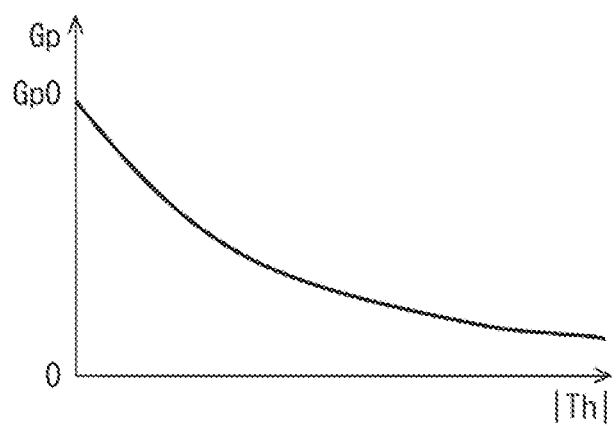
FIG. 8 is a characteristic diagram illustrating an example of characteristics of a proportional gain Gp according to the steering torque Th.

FIG. 8 illustrates a characteristic example of the proportional gain Gp according to the absolute value |Th| of the steering torque set by the proportional gain setting unit 61. The proportional gain setting unit 61 may set the proportional gain Gp so that the proportional gain Gp is a predetermined value Gp0 when the absolute value |Th| of the steering torque is zero, and the proportional gain Gp decreases as the |Th| increases.

As a result, when the steering torque Th is large, the driver's intention of steering is determined to be strong, so that even when the deviation $\Delta\theta$ is generated by steering, a change in the proportional component Op output by the proportionator 45 can be suppressed. By doing this, the change in the second assistance control value C2 is suppressed, and steering by the driver is prioritized.

Figure 9:
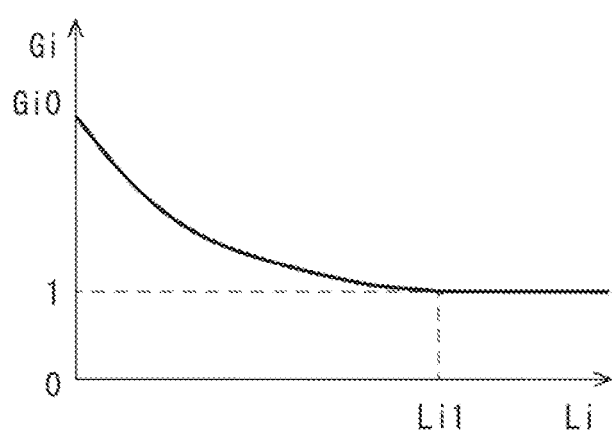
FIG. 9 is a characteristic diagram illustrating an example of characteristics of an increase gain Gi according to an input limit value Li.

FIG. 9 illustrates a characteristic example of the increase gain Gi according to the input limit value Li set by the increase gain setting unit 62.

The increase gain setting unit 62 may set the increase gain Gi so that when the input limit value Li is equal to or more than a threshold value Li1 (when it is relatively large), the increase gain Gi is "1", and when the input limit value Li is below the threshold value Li1 (when it is relatively small), the increase gain Gi is larger than "1" and increases as the input limit value Li decreases.

As a result, in the scene where the magnitude of the deviation $\Delta\theta$ input to the integrator 46 is limited (i.e., the scene where the change in the second assistance control value C2 is suppressed and steering by the driver is prioritized), the proportional component Op based on the deviation $\Delta\theta$ is increased according to the input limit value Li, thereby enabling improvement in followability to the target steering angle.

The increase gain setting unit 62 and the multiplier 64 are an example of "proportional component change unit" described in the claims.

Note that the increase gain setting unit 62 may set the increase gain Gi on the basis of the gradually decreasing gain Gd instead of the input limit value Li.

Reference will be made to FIG. 3. The post-limitation deviation $\Delta\theta r$ and the gradually decreasing gain Gd are input to the integrator 46. The integrator 46 integrates the post-limitation deviation $\Delta\theta r$ to calculate an integral component Oi of the PI control in the command value calculation unit 31.

In addition, the integrator 46 changes a result of the integration by the integrator 46 according to the gradually decreasing gain Gd to suppress an increase in the integral value of the deviation $\Delta\theta$ calculated by the integrator 46.

Figure 10:
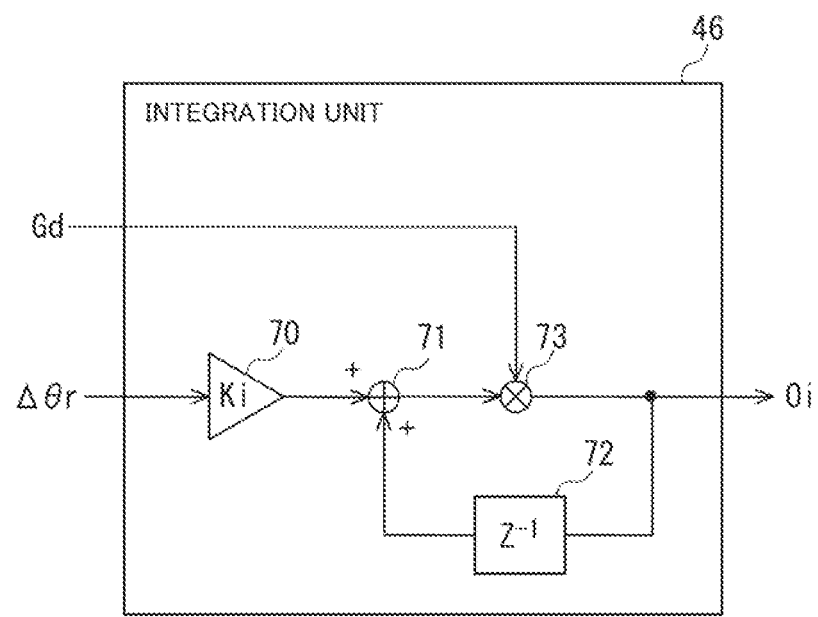
FIG. 10 is a block diagram illustrating an example of a functional structure of an integrator.

Reference will be made to FIG. 10. The integrator 46 includes an integral gain multiplication unit 70, an adder 71, a past value holding unit (delay processing unit) 72, and a multiplier 73.

The integral gain multiplication unit 70 multiplies the post-limitation deviation $\Delta\theta r$ by an integral gain Ki. The adder 71 adds a product (Ki×$\Delta\theta r$) to the integral component Oi that is an output value of the integrator 46 held in an immediately preceding cycle (one cycle before) through the past value holding unit 72 to calculate an integral value of the product (Ki×$\Delta\theta r$).

The multiplier 73 multiplies the integral value of the product (Ki×$\Delta\theta r$) output from the adder 71 by the gradually decreasing gain Gd to calculate the integral component Oi.

In this way, the absolute value calculation unit 50, the gradually decreasing gain change amount setting unit 54, the adder 55, the past value holding unit 56, and the multiplier 73 change the result of integration of the deviation $\Delta\theta$ according to the gradually decreasing gain Gd.

The absolute value calculation unit 50, the gradually decreasing gain change amount setting unit 54, the adder 55, the past value holding unit 56, and the multiplier 73 are an example of "integral suppression unit" described in the claims.

Note that the similar effect can be obtained also by adding the gradually decreasing gain Gd as a gradually decreasing change amount according to the steering torque Th to the integral value of the product (Ki×$\Delta\theta r$) between the post-limitation deviation $\Delta\theta r$ and the integral gain Ki instead of multiplying the gradually decreasing gain Gd by the multiplier 73. Additionally, the multiplier 73 may be arranged in a front stage of the adder 71 instead of arranging it in a rear stage of the adder 71.

Reference will be made to FIG. 3. The adder 47 adds the proportional component Op output from the proportionator 45 and the integral component Oi output from the integrator 46 to calculate the second assistance control value C2.

Figure 2:
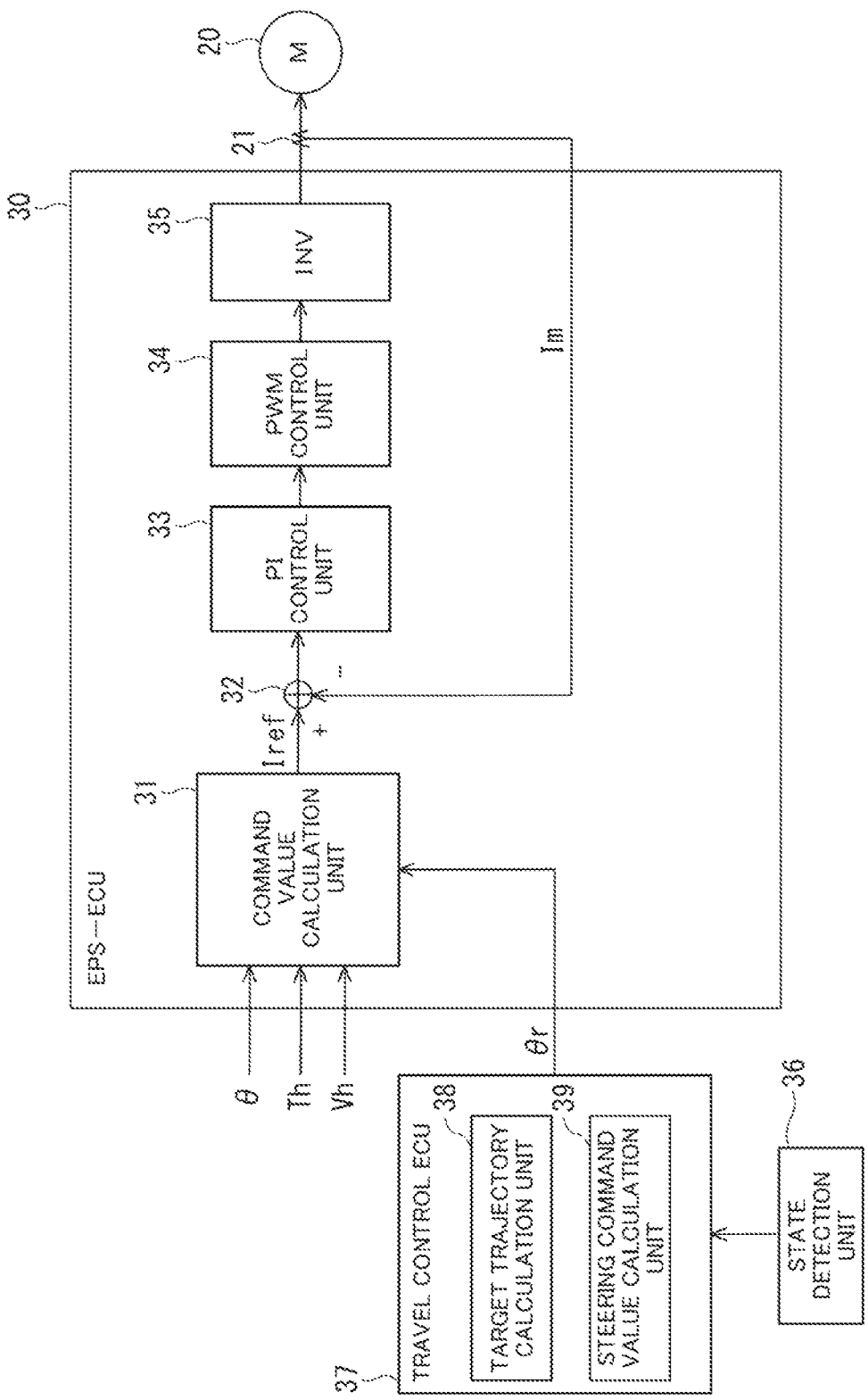
FIG. 2 is a block diagram illustrating an example of a functional structure of an electric power steering-electronic control unit (EPS-ECU) of the first and second embodiments.

The adder 48 adds the first assistance control value C1 and the second assistance control value C2 to calculate the current command value Iref, and outputs to the subtractor 32 illustrated in FIG. 2.

Operation

Next, an example of an actuator control method of the first embodiment will be described with reference to FIG. 11.

At step S1, the first assistance control value calculation unit 40 calculates the first assistance control value C1 on the basis of the steering torque Th and the vehicle speed Vh.

At step S2, the travel control ECU 37 calculates the target steering angle $\theta r$ that is the control target value of the steering angle $\theta$.

At step S3, the steering angle sensor 14 detects the actual steering angle $\theta$.

At step S4, the subtractor 41 subtracts the actual steering angle 9 from the target steering angle $\theta r$ to calculate the deviation $\Delta\theta$.

At step S5, the integral suppression variable calculation unit 42 calculates the input limit value Li and the gradually decreasing gain Gd.

At step S6, the input limiter 43 limits the magnitude of the deviation $\Delta\theta$ input to the integrator 46 according to the input limit value Li to suppress an increase in the integral value output by the integrator 46.

At step S7, the integrator 46 changes the result of integration of the deviation $\Delta\theta r$ by the integrator 46 according to the gradually decreasing gain Gd to suppress an increase in the integral value output by the integrator 46.

At step S8, the proportionator 45 changes the proportional component Op according to the input limit value Li, and increases the proportional component Op as the input limit value Li decreases.

At step S9, the adder 47 adds the proportional component Op output from the proportionator 45 and the integral component Oi output from the integrator 46 to calculate the second assistance control value C2.

At step S10, the adder 48 adds the first assistance control value C1 and the second assistance control value C2 to calculate the current command value Iref. Then, processing is ended.

Effects of First Embodiment (1) On the basis of the steering torque Th and the vehicle speed Vh, the first assistance control value calculation unit 40 calculates the first assistance control value C1 for controlling the steering assistance motor 20 that turns the steered wheels 8L and 8R. The travel control ECU 37 sets the target steering angle θr as a target value of a state amount indicating a traveling direction of the vehicle on the basis of the surrounding environment of the vehicle. The integrator 46 controls the steering assistance motor 20 by integral control according to the integral value of the deviation Δθ between the actual steering angle θ and the target steering angle θr.

The absolute value calculation unit 50, the input limit value change amount setting unit 51, the adders 52 and 55, the past value holding units 53 and 56, and the gradually decreasing gain change amount setting unit 54 calculate the input limit value Li and the gradually decreasing gain Gd as an integral value corresponding to the steering torque Th. The input limiter 43, the sign inverter 44, and the multiplier 73 suppress an increase in the integral value of the deviation Δθ according to the input limit value Li and the gradually decreasing gain Gd.

As a result, when the steering torque Th is large and the driver has a strong intention of steering, it is possible to suppress the second assistance control value C2 from changing in a direction opposite to the direction of steering by the driver due to the deviation Δθ caused by steering operation by the driver. Thus, a change in the steering feeling of the driver can be suppressed.

Additionally, by suppressing according to the integral value of the value corresponding to the steering torque Th instead of the steering torque Th, an increase in the integral value of the deviation Δθ is suppressed according to the duration during which steering holding continues even in a state such as the steering holding state where the steering torque Th does not change. This can suppress a change in the steering feeling of the driver due to an increase in the second assistance control value C2.

Furthermore, even when the steering torque Th decreases and suppression of the increase in the integral value of the deviation Δθ is relaxed, a sudden change in the second assistance control value C2 can be prevented since the integral value of the value corresponding to the steering torque Th changes more slowly than the steering torque Th as is.

(2) The absolute value calculation unit 50, the input limit value change amount setting unit 51, the adders 52 and 55, the past value holding units 53 and 56, and the gradually decreasing gain change amount setting unit 54 may integrate the input limit value change amount ΔLi and the gradually decreasing gain change amount ΔGd that change according to the absolute value |Th| of the steering torque to calculate the input limit value Li and the gradually decreasing gain Gd, respectively. The rate of change in the input limit value change amount ΔLi with respect to change in the absolute value |Th| of the steering torque equal to or more than the threshold value Th1 is larger than the rate of change when the absolute value |Th| s below the threshold value Th1. Additionally, the rate of change in the gradually decreasing gain change amount ΔGd with respect to change in the absolute value |Th| of the steering torque equal or more than the threshold value Th2 is larger than the rate of change when the absolute value |Th| is below the threshold value Th2.

As a result, when the driver has a strong intention of steering, the input limit value Li and the gradually decreasing Gd can be quickly changed, and the second assistance control value C2 can be adjusted according to the intention of steering.

On the other hand, when the driver has no (or less) intention of steering and suppression of the increase in the integral value of the deviation Δθ is relaxed, changes in the input limit value Li and the gradually decreasing gain Gd can be slowed down. This can slow down change in the second assistance control value C2 even when the deviation Δθ is large, so that a sudden change in the steering feeling of the driver can be prevented (3) The absolute value calculation unit 50, the input limit value change amount setting unit 51, the adder 52, the past value holding unit 53, the input limiter 43, and the sign inverter 44 may limit the deviation Δθ integrated in the calculation of the integral value of the deviation Δθ according to the input limit value Li.

The gradually decreasing gain change amount setting unit 54, the absolute value calculation unit 50, the adder 55, the past value holding unit 56, and the multiplier 73 may change the result of integration of the deviation Δθ according to the gradually decreasing gain Gd.

This can suppress an increase in the integral value of the deviation Δθ according to the input limit value Li and the gradually decreasing gain Gd.

(4) The proportionator 45 controls the steering assistance motor 20 by proportional control according to the proportional component Op of the deviation Δθ. The increase gain setting unit 62 and the multiplier 64 may change the proportional component Op according to the input limit value Li or the gradually decreasing gain Gd.

Thus, for example, the proportional component Op is increased as the input limit value Li decreases, whereby when the input limit value Li is small and the magnitude of the deviation Δθ input to the integrator 46 is limited, it is possible to increase the proportional component Op. As a result, in the scene where the magnitude of the deviation Δθ input to the integrator 46 is limited, i.e., in the scene where change in the second assistance control value C2 is suppressed and steering by the driver is prioritized, the proportional component Op is increased, thereby enabling improvement in followability to the target steering angle.

First Modification

Reference will be made to FIG. 5A. The input limit value change amount ΔLi is set to a positive value in the range where the absolute value |Th| of the steering torque is relatively small (specifically, the |Th| is below the threshold value Th1), and the smaller the absolute value |Th| of the steering torque, the larger the input limit value change amount ΔLi. Therefore, when the driver steers the wheel so as to cause the actual steering angle θ to approach the target steering angle θr and the absolute value |Th| of the steering torque decreases, the input Limit value Li increases, which makes it impossible to suppress integration of the integral component Oi output by the integrator 46. This results in increased steering reaction force despite the driver's intention of steering.

Thus, the integral suppression variable calculation unit 42 of the first modification determines the driver's intention of steering, and reduces a value of the input limit value change amount ΔLi when there is the intention of steering and the input limit value change amount ΔLi has a positive value to less than a value of the input limit value change amount ΔLi when there is no intention of steering and the input limit value change amount ΔLi has a positive value. This can suppress an increase in the input limit value Li when the absolute value |Th| of the steering torque decreases despite the driver's intention of steering. Note that the present modification is also applicable to second and third embodiments and first to third modifications of the third embodiment that will be described below.

Figure 12A:
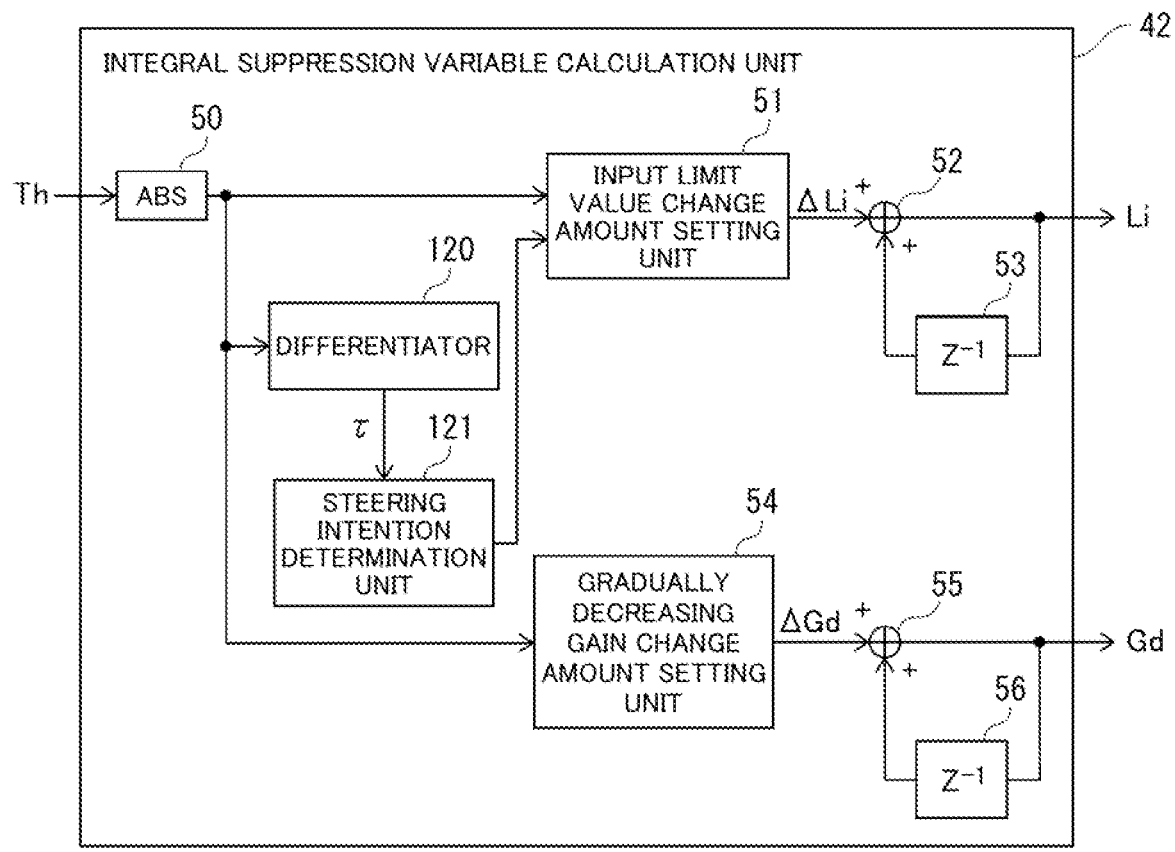
FIG. 12A is a block diagram illustrating an example of a functional structure of an integral suppression variable calculation unit of a first modification of the first embodiment.

Reference will be made to FIG. 12A. The integral suppression variable calculation unit 42 of the first modification has a functional structure similar to that of the integral suppression variable calculation unit 42 of the first embodiment illustrated in FIG. 4, and the same reference signs indicate the similar components.

The integral suppression variable calculation unit 42 of the first modification includes a differentiator 120 and a steering intention determination unit 121.

The differentiator 120 differentiates the absolute value |Th| of the steering torque to calculate a change speed τ of the absolute value |Th| of the steering torque.

The steering intention determination unit 121 determines the presence or absence of the driver's intention of steering according to the change speed τ. For example, when the change speed τ is equal to or more than a threshold value, it is determined that there is the intention of steering, whereas when the change speed τ is below the threshold value, it is determined that there is no intention of steering.

The input limit value change amount setting unit 51 sets the input limit value change amount ΔLi that changes according to the change in the absolute value |Th| of the steering torque. In this case, the input limit value change amount setting unit 51 sets the input limit value change amount ΔLi different in characteristics depending on the presence or absence of the driver's intention of steering.

Figure 12B:
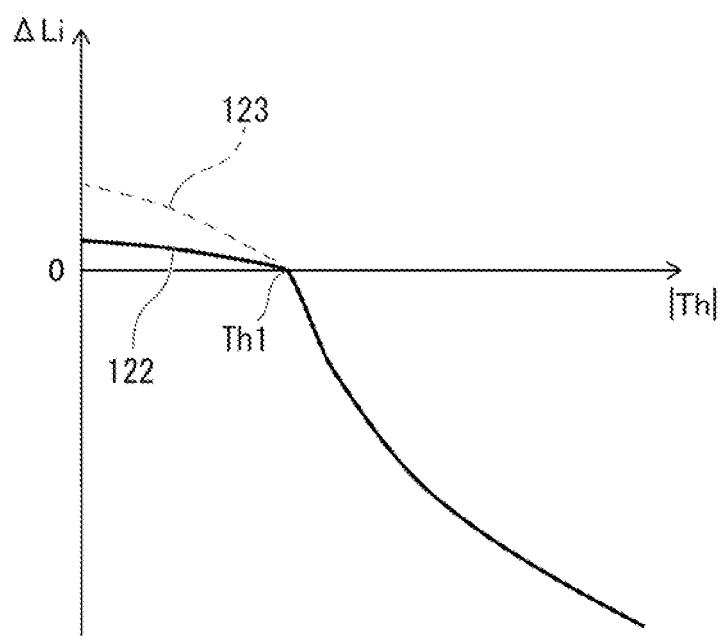
FIG. 12B is a characteristic diagram illustrating an example of characteristics of an input limit value change amount ΔLi of the first modification of the first embodiment.

Reference will be made to FIG. 12B. A solid line 122 indicates characteristics of the input limit value change amount ΔLi when there is the driver's intention of steering, and a broken line 123 indicates characteristics of the input limit value change amount ΔLi when there is not the driver's intention of steering. For example, the input limit value change amount setting unit 51 may set the input limit value change amount ΔLi different in characteristics by using a map different depending on the presence or absence of the driver's intention of steering.

As illustrated, when the input limit value change amount ΔLi has a negative value in a range where the absolute value |Th| of the steering torque is relatively large (specifically, a range where the |Th| is equal to or more than the threshold value Th1), characteristics 122 of the input limit value change amount ΔLi where there is the intention of steering may be equal to characteristics 123 of the input limit value change amount ΔLi where there is not the intention of steering.

On the other hand, when the input limit value change amount ΔLi has a positive value in a range where the absolute value |Th| of the steering torque is relatively small (specifically, a range where the |Th| is below the threshold value Th1), the input limit value change amount ΔLi (the solid line 122) where there is the intention of steering is reduced to less than the input limit value change amount ΔLi (the broken line 123) where there is not the intention of steering.

With such a structure, the value of the input limit value change amount ΔLi when there is the intention of steering and the input limit value change amount ΔLi has a positive value can be reduced to less than the value of the input limit value change amount ΔLi when there is not the intention of steering and the input limit value change amount ΔLi has a positive value.

Additionally, when the change speed τ is in a range below the threshold value, the input limit value change amount ΔLi may be set to have characteristics between the characteristics 122 and the characteristics 123. This can suppress a sudden change in the integral value due to a change in the input limit value change amount ΔLi.

Second Modification

The integral suppression variable calculation unit 42 of a second modification reduces the input limit value change amount ΔLi according to the change speed of the absolute value |Th| of the steering torque. Even when the input limit value change amount ΔLi is reduced in this way, it is possible to suppress an increase in the input limit value Li when the absolute value |Th| of the steering torque decreases despite the driver's intention of steering, as with the above first modification. Note that the present modification is also applicable to the second embodiment and the third embodiment and the first to third modifications of the third embodiment that will be described below.

Figure 13A:
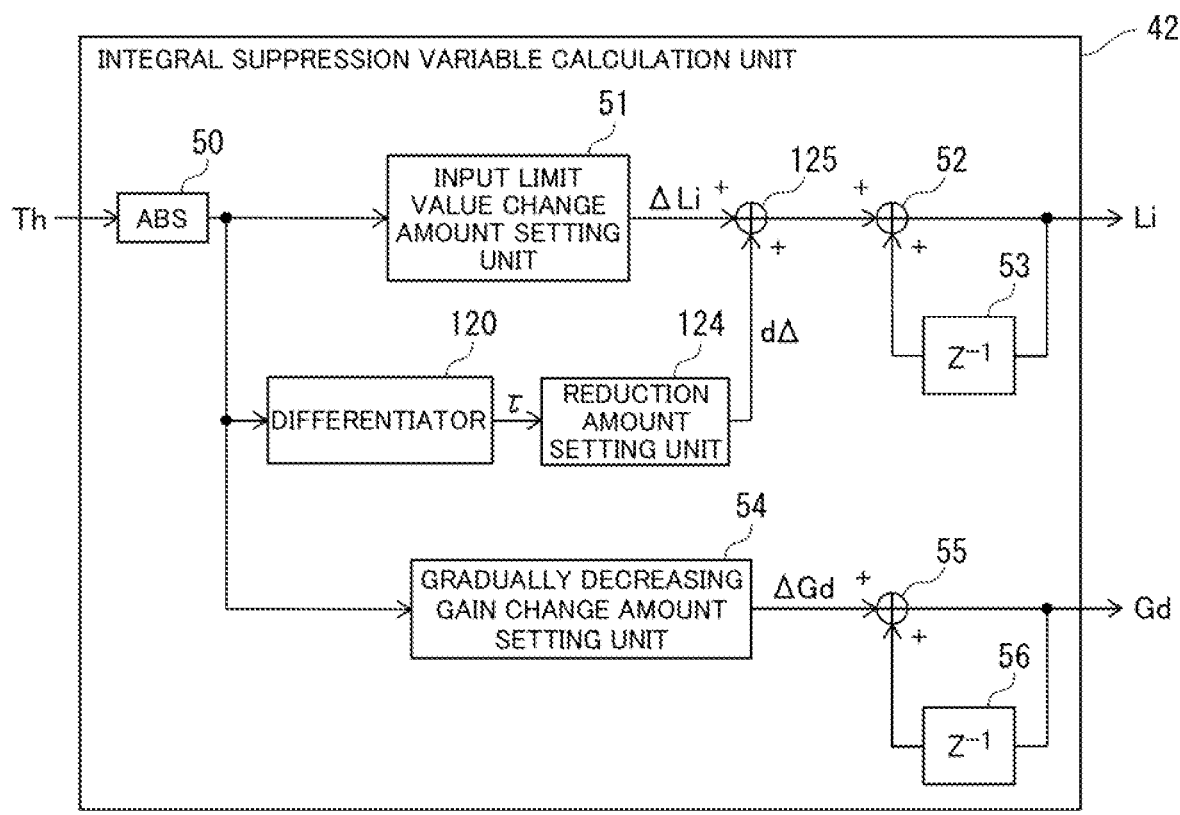
FIG. 13A is a block diagram illustrating an example of a functional structure of an integral suppression variable calculation unit of a second modification of the first embodiment.

Reference will be made to FIG. 13A. The integral suppression variable calculation unit 42 of the second modification has a functional structure similar to that of the integral suppression variable calculation unit 42 of the first embodiment illustrated in FIG. 4, and the same reference signs indicate the similar components.

The integral suppression variable calculation unit 42 of the second modification includes the differentiator 120, a reduction amount setting unit 124, and an adder 125.

The input limit value change amount setting unit 51 of the second modification sets the input limit value change amount ΔLi having the same characteristics as those in the first embodiment. For example, the input limit value change amount setting unit 51 of the second modification may set the input limit value change amount ΔLi having the characteristics illustrated in FIG. 5A.

The reduction amount setting unit 124 calculates a reduction amount dΔ of the input limit value change amount ΔLi according to the change speed τ of the absolute value |Th| of the steering torque.

Figure 13B:
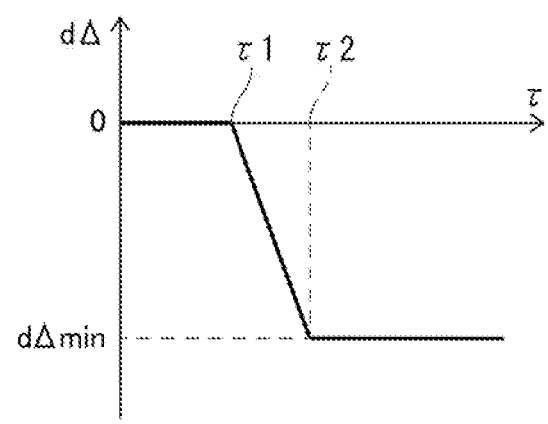
FIG. 13B is a characteristic diagram illustrating an example of characteristics of a reduction amount dΔ for reducing the input limit value change amount ΔLi.

FIG. 13B illustrates a characteristic example of the reduction amount dΔ according to the change speed τ of the absolute value |Th| of the steering torque.

When the change speed τ is relatively small (specifically, when the change speed τ is below a threshold value τ1), the reduction amount dΔ is zero.

On the other hand, when the change speed τ is equal to or more than the threshold value τ1 and below a threshold value τ2, the reduction amount dΔ has a negative value and decreases as the change speed τ increases (in other words, the absolute value of the reduction amount dΔ increases).

When the change speed τ is equal to or more than the threshold value τ2, the reduction amount dΔ maintains a minimum value dΔmin.

Reference will be made to FIG. 13A. The adder 125 adds the reduction amount dΔ having the characteristics as in FIG. 13B to the input limit value change amount ΔLi, and then the input limit value change amount ΔLi after the addition of the reduction amount dΔ is reduced by the reduction amount dΔ as the change speed τ of the absolute value |Th| of the steering torque increases.

Specifically, when the change speed τ is below the threshold value τ1, the input limit value change amount ΔLi is not reduced, and when the change speed τ is equal to or more than the threshold value τ2, the input limit value change amount ΔLi is reduced by the reduction amount dΔmin.

In addition, when the change speed τ is equal to or more than the threshold value τ1 and below the threshold value τ2, the input limit value change amount ΔLi is reduced by the reduction amount dΔ having an absolute value larger as the change speed of the absolute value |Th| of the steering torque increases.

Even with such a structure, the value of the input limit value change amount ΔLi when there is the intention of steering can be reduced to less than the value of the input limit value change amount ΔLi when there is not the intention of steering.

Note that, as with the first modification, only when the input limit value change amount ΔLi has a positive value, the value of the input limit value change amount ΔLi when there is the intention of steering may be reduced to less than the value of the input limit value change amount ΔLi when there is not the intention of steering. For example, the reduction amount setting unit 124 may determine whether or not the absolute value |Th| of the steering torque is equal to or more than the threshold value Th1, and may set the reduction amount dΔ to zero when the absolute value |Th| of the steering torque is equal to or more than the threshold value Th1.

Second Embodiment

The command value calculation unit 31 of the second embodiment sets a target steering angular velocity ωr on the basis of a difference between the target steering angle θr and the actual steering angle θ, and calculates the second assistance control value C2 by PI control based on a deviation Δω (=ωr−ω) between an actual steering angular velocity ω and the target steering angular velocity ωr.

In this way, cascade control having a steering angular velocity feedback as a minor loop can improve the responsiveness and stability of a position control loop.

Figure 14:
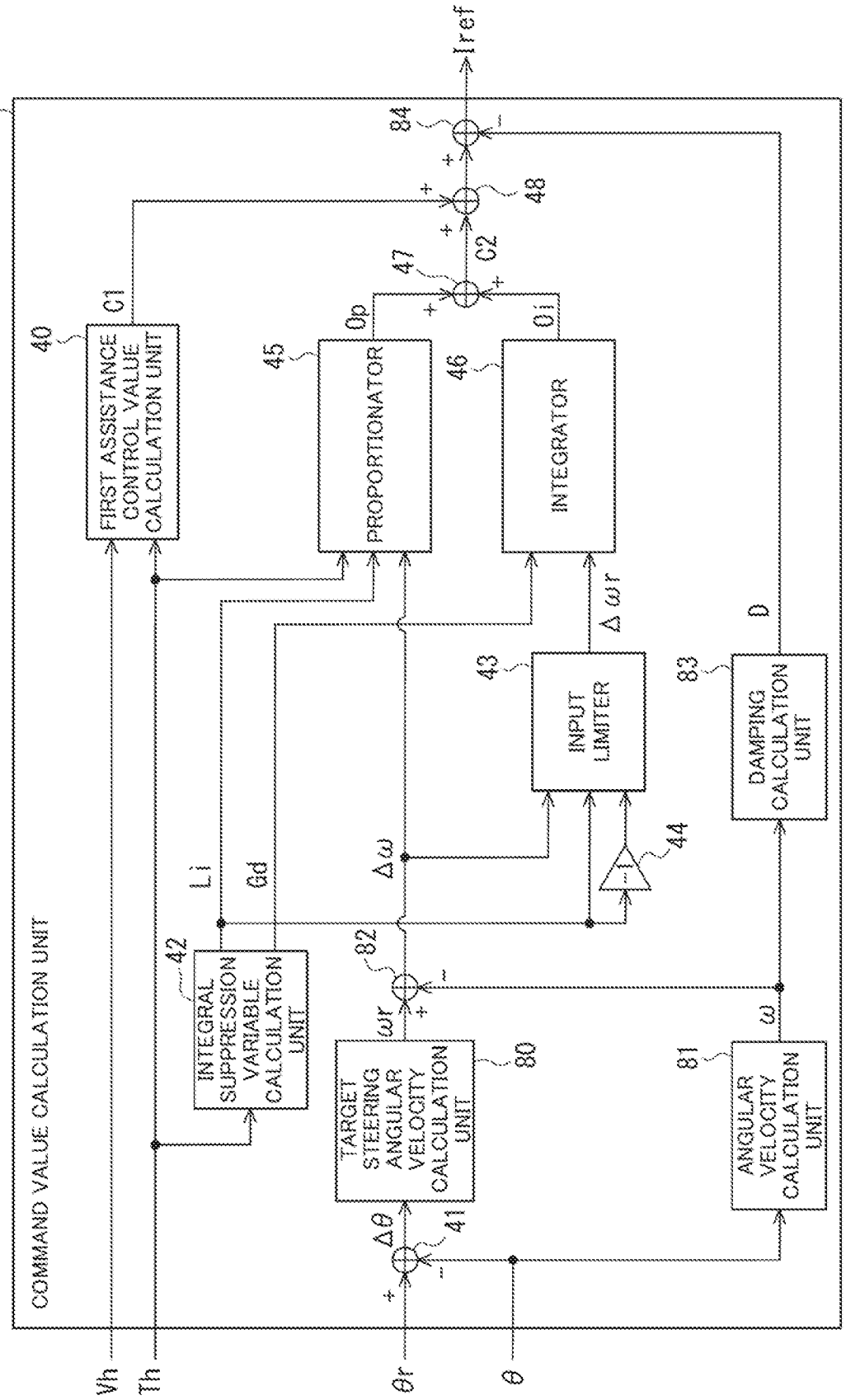
FIG. 14 is a block diagram illustrating an example of a functional structure of a command value calculation unit of the second embodiment.

Reference will be made to FIG. 14. The command value calculation unit 31 of the second embodiment has a functional structure similar to the first embodiment illustrated in FIG. 3, and the same reference signs indicate the similar components.

The command value calculation unit 31 of the second embodiment includes a target steering angular velocity calculation unit 80, an angular velocity calculation unit 81, a subtractor 82, a damping calculation unit 83, and a subtractor 84. The subtractors 41 and 82, the target steering angular velocity calculation unit 80, the proportionator 45, the integrator 46, and the adder 47 are an example of "target value control unit" described in the claims.

The subtractor 41 calculates a difference Δθ between the target steering angle θr and the actual steering angle θ.

The target steering angular velocity calculation unit 80 calculates the target steering angular velocity ωr on the basis of the difference Δθ between the target steering angle θr and the actual steering angle θ. The angular velocity calculation unit 81 differentiates the actual steering angle θ to calculate the actual steering angular velocity ω.

The subtractor 82 calculates the deviation Δω (=ωr−ω) between the actual steering angular velocity ω and the target steering angular velocity ωr. The deviation Δω is input to the input limiter 43 and the proportionator 45.

The input limiter 43 outputs a post-limitation deviation Δωr obtained by limiting the deviation Δω to be input to the integrator 46 according to the input limit values Li and (−Li). The operation of the input limiter 43 of the second embodiment that limits the deviation Δω to the post-limitation deviation Δωr is the same as the operation of the input limiter 43 of the first embodiment that limits the deviation Δθ to the post-limitation deviation Δθr.

The proportionator 45 multiplies the proportional gain Gp according to the steering torque Th by the deviation Δω to calculate the proportional component Op of the PI control in the command value calculation unit 31. The proportionator 45 changes the proportional component Op according to the input limitation value Li.

The operation of the proportionator 45 of the second embodiment is the same as the operation of the proportionator 45 of the first embodiment except that the proportional gain Gp is multiplied by the deviation Δω.

The integrator 46 integrates the post-limitation deviation Δωr to calculate the integral component Oi of the PI control in the command value calculation unit 31. The integrator 46 changes the result of integration by the integrator 46 according to the gradually decreasing gain Gd to suppress an increase in an integral value of the deviation Δω calculated by the integrator 46. The operation of the integrator 46 of the second embodiment is the same as the operation of the integrator 46 of the first embodiment except that the post-limitation deviation Δωr is integrated.

The damping calculation unit 83 calculates a damping control value D according to the actual steering angular velocity ω. The subtractor 84 subtracts the damping control value D from the sum of the first assistance control value C1 and the second assistance control value C2 to calculate the current command value Iref.

Figure 15:
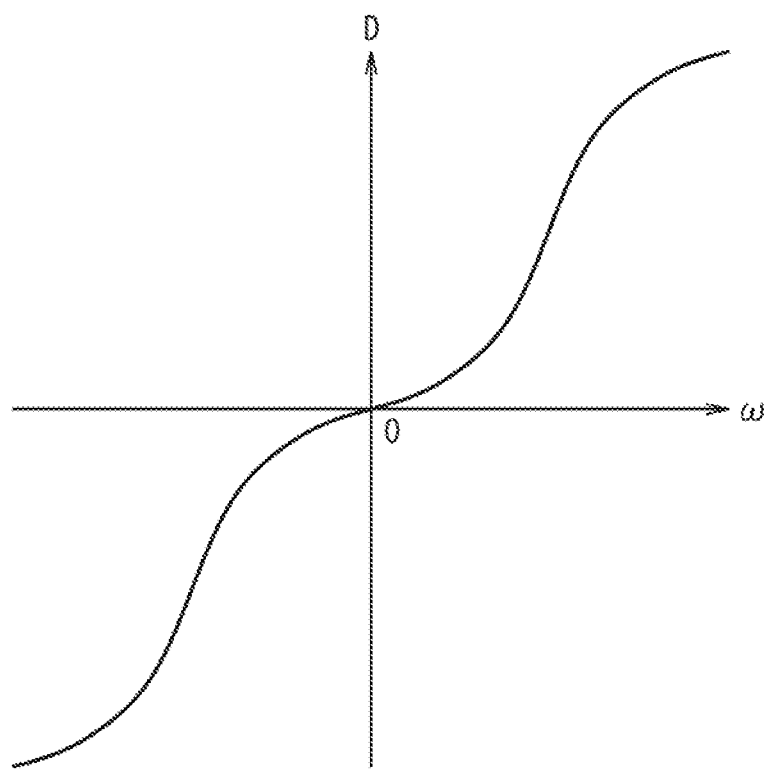
FIG. 15 is a characteristic diagram illustrating an example of characteristics of a damping control value D according to a steering angular velocity co.

Reference will be made to FIG. 15. The damping calculation unit 83 may set so that the larger the absolute value |ω| of the actual steering angular velocity, the larger the absolute value of the damping control value D. This enables the steering angular velocity to be adjusted so as not to suddenly change when letting the actual steering angle θ follow the target steering angle θr.

Note that a rate of increase in the large damping control value D with respect to the absolute value |ω| of the actual steering angular velocity may be set so that the rate of increase is small in regions with small and large absolute values |ω| of the actual steering angular velocity, and is large in an intermediate region therebetween.

Operation

Figure 16:
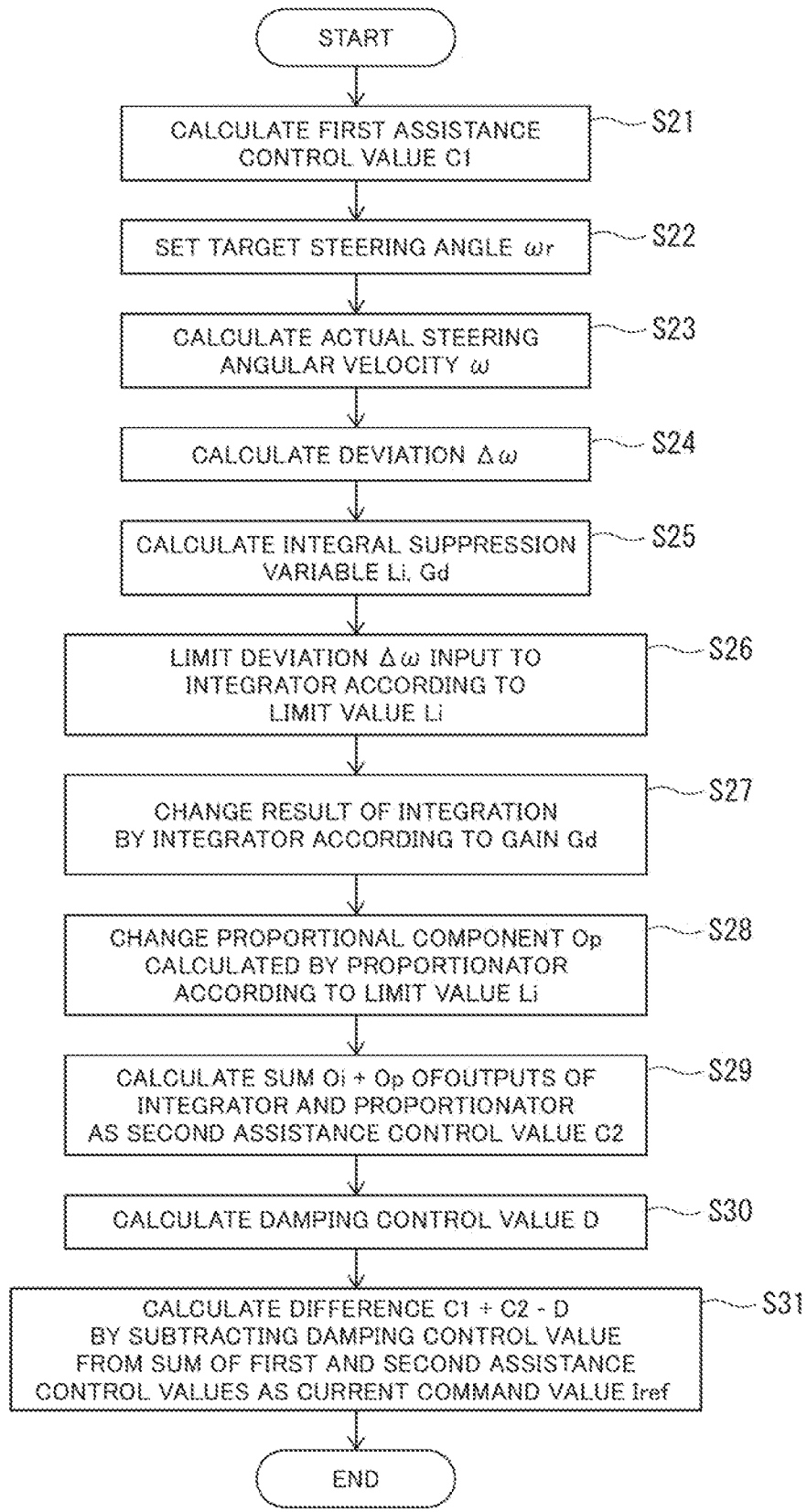
FIG. 16 is a flowchart illustrating an example of an actuator control method of the second embodiment.

Next, an example of an actuator control method of the second embodiment will be described with reference to FIG. 16.

Figure 11:
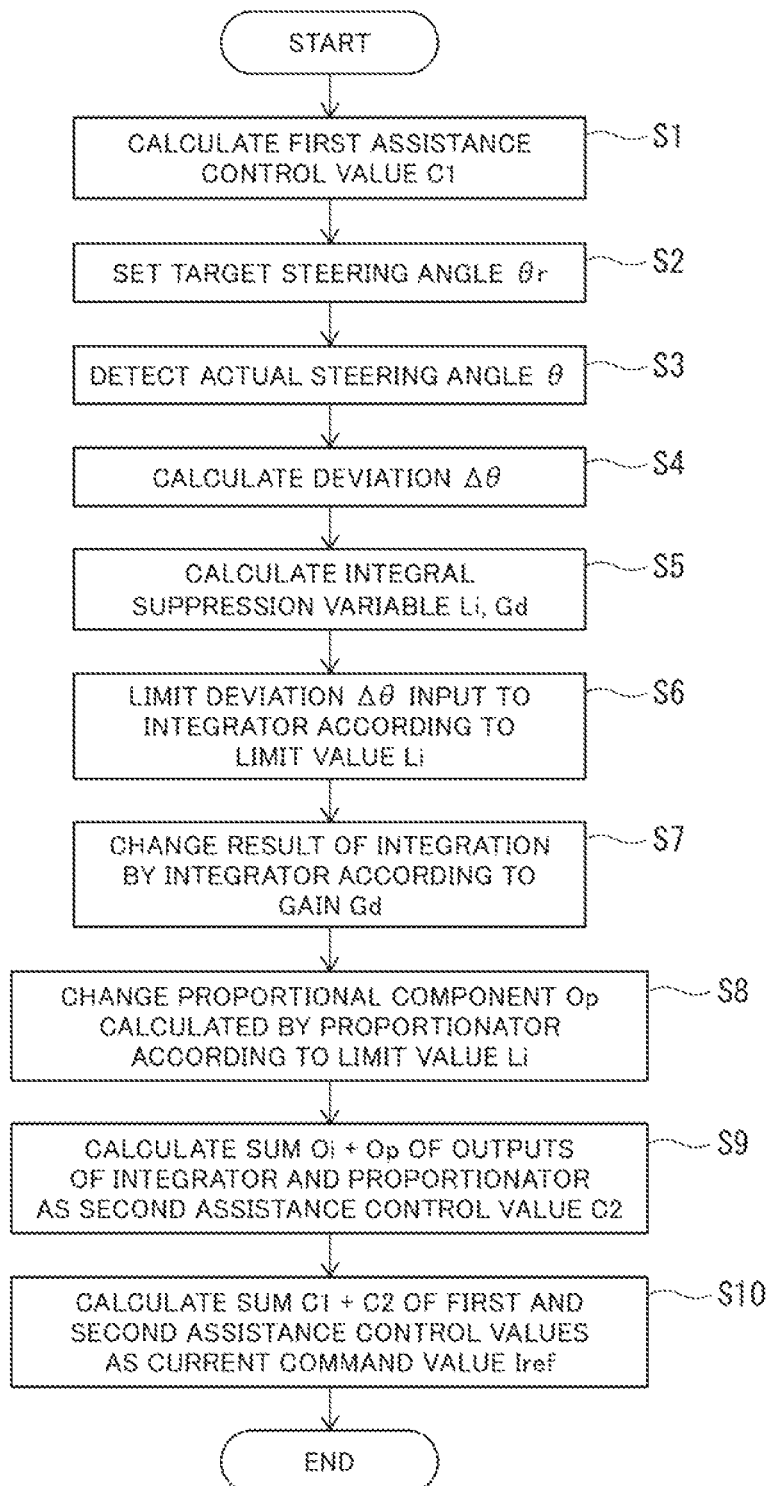
FIG. 11 is a flowchart illustrating an example of an actuator control method of the first embodiment.

An operation of step S21 is the same as the operation of step S1 in FIG. 11.

At step S22, the target steering angular velocity calculation unit 80 sets the target steering angular velocity ωr on the basis of the difference Δθ between the target steering angle θr and the actual steering angle θ.

At step S23, the angular velocity calculation unit 81 differentiates the actual steering angle θ to calculate the actual steering angular velocity ω.

At step S24, the subtractor 82 calculates the deviation Δω (=ωr−ω) between the actual steering angular velocity ω and the target steering angular velocity ωr.

An operation of step S25 is the same as the operation of step S5 in FIG. 11.

At step S26, the input limiter 43 limits the magnitude of the deviation Δω input to the integrator 46 according to the input limit value Li to suppress an increase in an integral value output by the integrator 46.

At step S27, the integrator 46 changes a result of integration of the deviation Δωr by the integrator 46 according to the gradually decreasing gain Gd to suppress an increase in the integral value output by the integrator 46.

Operations of steps S28 and S29 are the same as those of steps S8 and S9 in FIG. 11.

At step S30, the damping calculation unit 83 calculates a damping control value D according to the actual steering angular velocity ω. At step S31, the adder 48 adds the first assistance control value C1 and the second assistance control value C2. The subtractor 84 subtracts the damping control value D from the sum of the first assistance control value C1 and the second assistance control value C2 to calculate the current command value Iref. Then, processing is ended.

Effects of Second Embodiment

The first assistance control value calculation unit 40 calculates the first assistance control value C for controlling the steering assistance motor 20 that turns the steered wheels 8L and 8R on the basis of the steering torque Th and the Vehicle speed Vh. The travel control ECU 37 sets the target steering angle θr as the target value of a state amount indicating the traveling direction of the vehicle on the basis of the surrounding environment of the vehicle. The target steering angular velocity calculation unit 80 calculates the target steering angular velocity ωr on the basis of the difference between the actual steering angle θ and the target steering angle θr. The integrator 46 controls the steering assistance motor 20 by integral control according to the integral value of the deviation Δω between the actual steering angular velocity ω and the target steering angular velocity ωr.

The absolute value calculation unit 50, the input limit value change amount setting unit 51, the adders 52 and 55, the past value holding units 53 and 56, and the gradually decreasing gain change amount setting unit 54 calculate the input Limit value Li and the gradually decreasing gain Gd as an integral value corresponding to the steering torque Th. The input limiter 43, the sign inverter 44, and the multiplier 73 suppress an increase in the integral value of the deviation Δω according to the input limit value Li and the gradually decreasing gain Gd.

In this way, even when the steering assistance motor 20 is controlled by integral control according to the integral value of the deviation Δω from the target steering angular velocity ωr, the similar effects as those of the first embodiment can be obtained.

Furthermore, according to the second embodiment, cascade control having the steering angular velocity feedback as a minor loop can improve the responsiveness and stability of the position control loop.

Third Embodiment

An actuator control device of the third embodiment controls a turning motor that turns steered wheels in a steer-by-wire (SBW) mechanism in which the steering wheel 1 is mechanically separated from the steered wheels 8L and 8R. Note that means for turning the turning motor is not limited to the motor, and various kinds of actuators can be used.

In the steer-by-wire mechanism, the current command value Iref that is the control target value of a drive current for the turning motor is determined on the basis of the steering angle θ of the steering wheel 1 by the driver and the vehicle speed Vh. Additionally, a current command value of a reaction force motor that applies steering reaction force to the steering wheel 1 is determined according to an actual turning angle θs of the steered wheels 8L and 8R and the vehicle speed Vh.

When executing driving assistance (such as lane keeping assistance, automatic parking, or automatic lane change) that controls steering on the basis of the surrounding environment of the vehicle, the current command value is added that controls the turning motor so as to cause the actual turning angle to approach a target turning angle set on the basis of the surrounding environment of the vehicle.

For example, the current command value Iref is calculated by adding a second current command value Iref2 that controls the turning motor so as to cause the actual turning angle to approach a second target turning angle θr2 set on the basis of the surrounding environment of the vehicle to a first current command value Iref1 based on a first target turning angle θr1 set by the steering angle θ of the steering wheel 1 by the driver and the vehicle speed Vh.

The second current command value Iref2 according to the surrounding environment of the vehicle is calculated by PI control based on a deviation Δθ (=θr2−θr1) obtained by subtracting the first target turning angle θr1 from the second target turning angle θr2, and, in this calculation, there is obtained an integral value of the deviation Δθ between the second target turning angle θr2 and the first target turning angle θr1.

In the third embodiment, in the calculation of the second current command value Iref2, an increase in the integral value of the deviation between the second target turning angle θr2 and the first target turning angle θr1 is suppressed according to the integral value of a value corresponding to the operation state amount by the driver with respect to the steering mechanism.

As a result, there can be obtained the similar effects as those in the first and second embodiments. In other words, the third embodiment can suppress the second current command value Iref2 from changing in a direction opposite to the direction of steering by the driver due to the deviation Δθ between the first target turning angle θr1 and the second target turning angle θr2 caused by the steering by the driver, which can suppress a change in the steering feeling of the driver.

In addition, even in the state such as the steering holding state where the operation state amount does not change, an increase in the integral value of the deviation Δθ is suppressed according to the duration during which steering holding continues, which thus can suppress a change in the steering feeling of the driver due to an increase in the second current command value Iref2.

Furthermore, a sudden change in the second current command value Iref2 can be prevented since the integral value slowly changes even when relaxing the suppression due to a decrease in the operation state amount after suppressing an increase in the integral value of the deviation $\Delta\theta$ due to an increase in the operation state amount.

Figure 17:
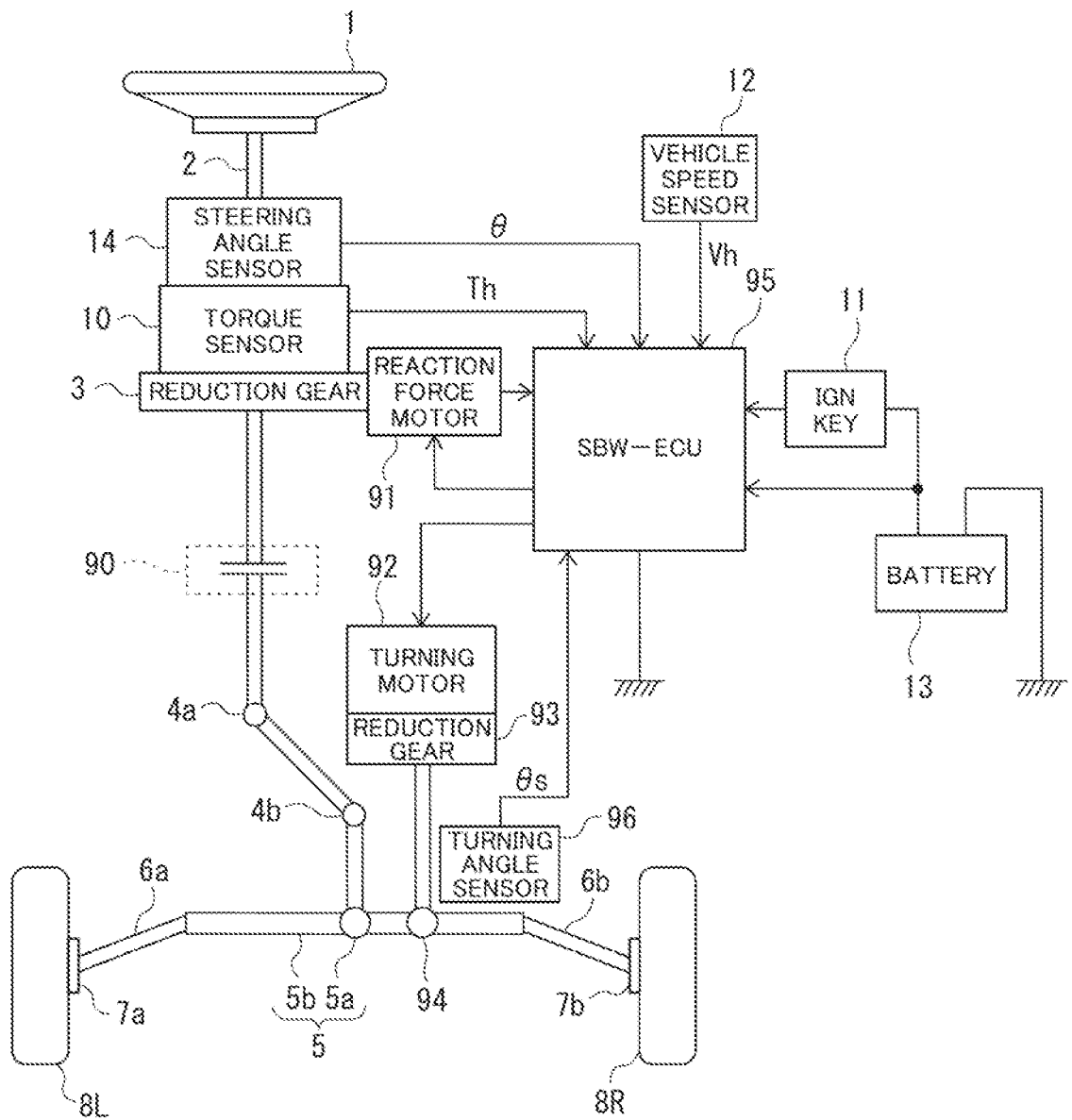
FIG. 17 is a structural diagram illustrating an outline of an example of a steer-by-wire mechanism of a third embodiment.

FIG. 17 illustrates an outline of an example of the steer-by-wire mechanism of the third embodiment. The same reference signs are given to the similar components as those of the electric power steering device illustrated in FIG. 1.

The steer-by-wire mechanism includes a backup clutch 90, a reaction force motor 91, a turning motor 92, a reduction gear 93, a pinion 94, an BW-ECU 95, and a turning angle sensor 96.

The backup clutch 90 mechanically disconnects the steering wheel 1 and the steered wheels 8L and 8R when in a released state, and mechanically connects the steering wheel 1 and the steered wheels 8L and 8R when in an engaged state.

The reaction force motor 91 that applies a reaction force torque Th to the steering wheel 1 is connected to the steering shaft 2 via the reduction gear 3.

The turning motor 92 that turns the steered wheels 8L and 8R is connected to the pinion 94 via the reduction gear 93, and the pinion 94 engages with the rack 5b. This converts a rotational motion of the turning motor 92 into a linear motion in the vehicle width direction of the rack 5b. The rack 5b is provided with the turning angle sensor 96 that detects an amount of movement of the rack 5b to detect the actual turning angle $\theta s$ of the steered wheels 8L and 8R.

Electrical power from the battery 13 is supplied to the SBW-ECU 95 that is a controller for controlling the steer-by-wire mechanism, and an ignition key signal is input to the SBW-ECU 95 through the ignition (IGN) key 11.

The SBW-ECU 95 calculates a current command value of a turning control command on the basis of the vehicle speed Vh detected by the vehicle speed sensor 12, the steering angle $\theta$ detected by the steering angle sensor 14, and the actual turning angle $\theta s$ detected by the turning angle sensor 96, and controls a current supplied to the turning motor 92 by a voltage control command value obtained by subjecting the current command value to compensation or the like.

Additionally, the SBW-ECU 95 calculates a target reaction force torque on the basis of the vehicle speed Vh detected by the vehicle speed sensor 12 and the actual turning angle $\theta s$ detected by the turning angle sensor 96, and performs feedback control for causing the reaction force torque Th detected by the torque sensor 10 to approach the target reaction force torque.

The SBW-ECU 95 may include, for example, a computer including a processor and peripheral components such as a storage device. The processor may be, for example, a CPU or an MPU.

The storage device may include any of a semiconductor storage device, a magnetic storage device, and an optical storage device. The storage device may include memories, such as register, cache memory, and ROM and RAM used as primary storage.

Functions of the SBW-ECU 95 that will be described below are realized by, for example, causing the processor of the SBW-ECU 95 to execute a computer program stored in the storage device.

Note that the SBW-ECU 95 may be formed by dedicated hardware for executing each information processing that will be described below.

For example, the SBW-ECU 95 may include a functional logic circuit set in a general-purpose semiconductor integrated circuit. For example, the SBW-ECU 95 may include a programmable logic device such as a field-programmable gate array, or the like.

Figure 18:
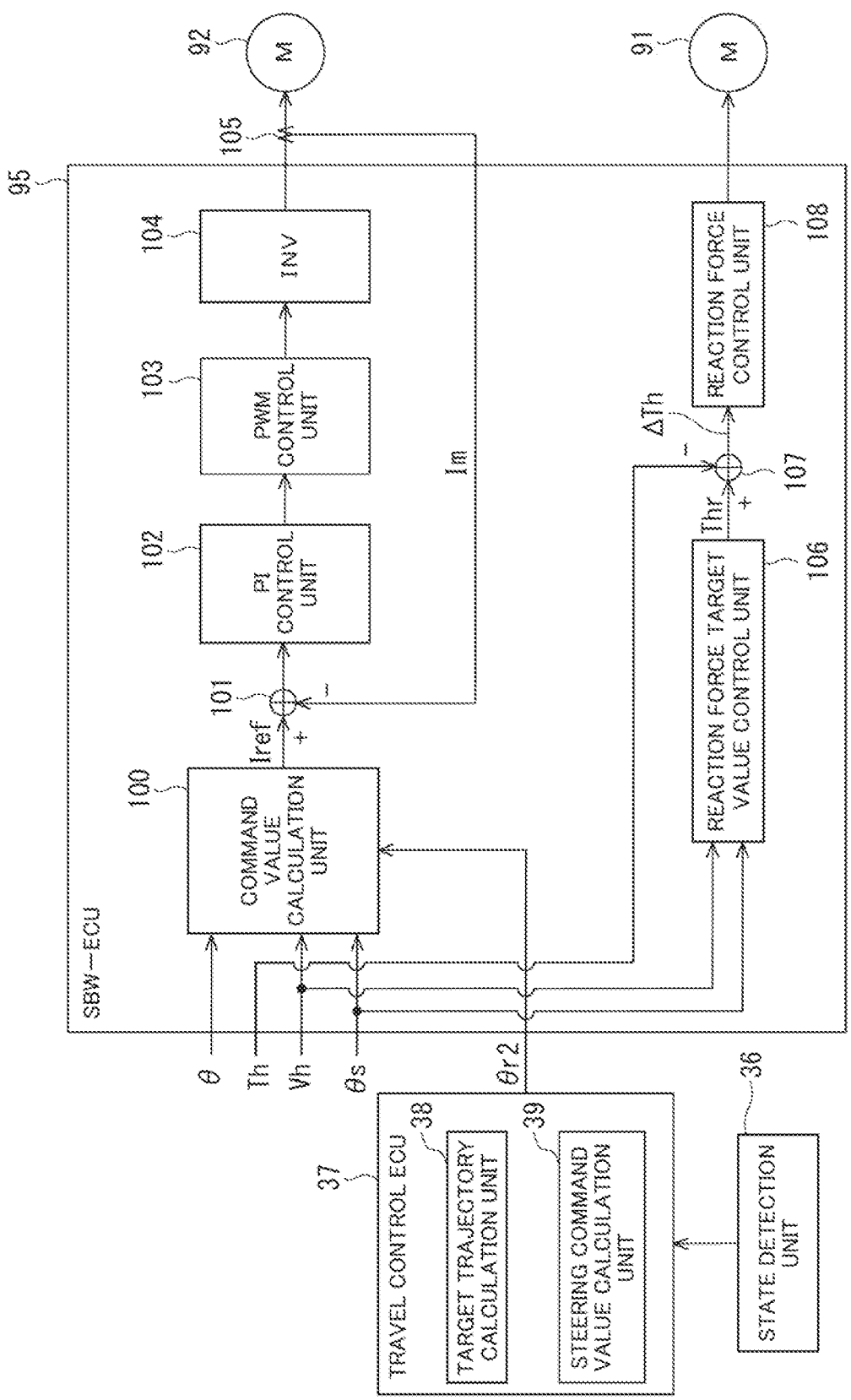
FIG. 18 is a block diagram illustrating an example of a functional structure of a steer by wire-electronic control unit (SBW-ECU) of the third embodiment.

An example of a functional structure of the SBW-ECU 95 of the third embodiment will be described with reference to FIG. 18. The SBW-ECU 95 includes a command value calculation unit 100, a subtractor 101, a PI control unit 102, a PWM control unit 103, an inverter 104, a reaction force target value control unit 106, a subtractor 107, and a reaction force control unit 108.

The command value calculation unit 100 calculates the current command value Iref that is a control target value of a drive current of the turning motor 92 on the basis of the second target turning angle $\theta r2$ set by the travel control ECU 37, the steering angle $\theta$, the vehicle speed Vh, and the actual turning angle $\theta s$.

The steering command value calculation unit 39 of the travel control ECU 37 calculates the second target turning angle $\theta r2$ that is a control target value of the turning angle $\theta$ based on the surrounding environment of the vehicle on the basis of the target trajectory calculated by the target trajectory calculation unit 38 and the detection result by the state detection unit 36, and outputs to the EP-ECU 30.

The current command value Iref calculated by the command value calculation unit 100 is input to the subtractor 101, in which a deviation (Iref−Im) from the fed-back motor current value Im is calculated, and the deviation (Iref−Im) is input to the PI control unit 102 for improving characteristics of steering operation.

A steering assistance command value Vref obtained by the characteristic improvement by the PI control unit 102 is input to the PWM control unit 103, and furthermore, the turning motor 92 is PWM-driven via the inverter 104 as a drive unit. The current value Im of the turning motor 92 is detected by a motor current detector 105 and fed back to the subtractor 101. The inverter 104 uses a field effect transistor (FET) as a drive element, and is formed by a FET bridge circuit.

According to the actual turning angle $\theta s$ and the vehicle speed Vh, the reaction force target value control unit 106 sets a target reaction force torque Thr that is a control target value of a steering reaction force torque to be applied to the steering wheel 1. The reaction force target value control unit 106 may set the target reaction force torque Thr different depending on whether the steering wheel 1 is turned forth or back.

The subtractor 107 calculates a deviation $\Delta Th$ between the reaction force torque Th detected by the torque sensor 10 and the target reaction force torque Thr.

The reaction force control unit 108 generates a control current for causing the reaction force torque Th to approach the target reaction force torque Thr by feedback control based on the deviation $\Delta Th$, and outputs to the reaction force motor 91.

Figure 19:
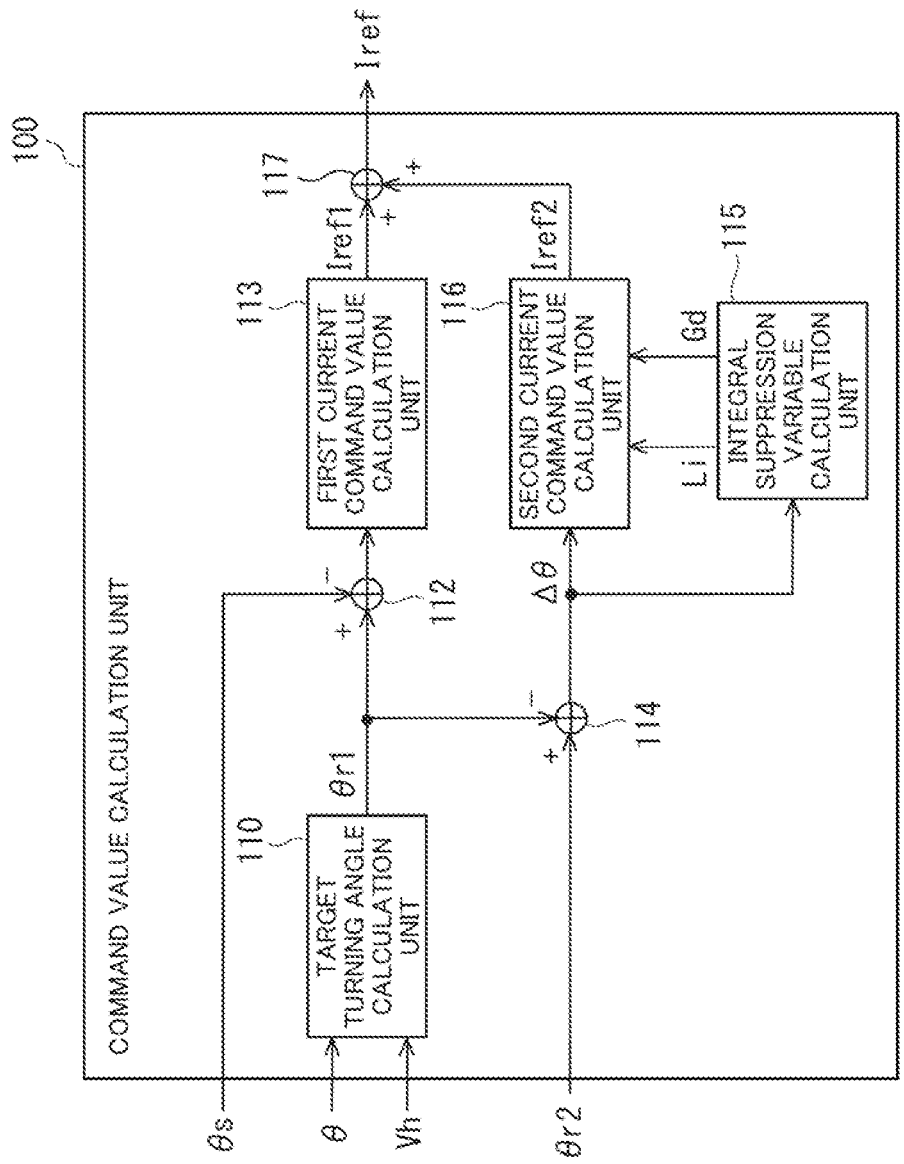
FIG. 19 is a block diagram illustrating an example of a functional structure of a command value calculation unit of the third embodiment.

Next, a functional structure of the command value calculation unit 100 will be described with reference to FIG. 19. The command value calculation unit 100 calculates the first current command value Iref1 that controls the turning motor 92 on the basis of the operation state amount that changes according to operation of the steering wheel 1 by the driver and the second current command value Iref2 that controls the turning motor 92 so as to cause the actual turning angle θs to approach the second target turning angle θr2 set on the basis of the surrounding environment of the vehicle.

Therefore, the command value calculation unit 100 includes a target turning angle calculation unit 110, subtractors 112 and 114, a first current command value calculation unit 113, a second current command value calculation unit 116, and an adder 117.

The target turning angle calculation unit 110 sets the first target turning angle θr1 on the basis of the steering angle θ of the steering wheel 1 by the driver and the vehicle speed Vh.

The subtractor 112 calculates a deviation (θr1−θs) by subtracting the actual turning angle θs from the first target turning angle θr1, and inputs the deviation (θr1−θs) to the first current command value calculation unit 113. The first current command value calculation unit 113 calculates the first current command value Iref1 by feedback control for causing the deviation (θr1−θs) to approach zero.

On the other hand, the subtractor 114 calculates a deviation Δθ (=θr2−θr1) by subtracting the first target turning angle θr1 from the second target turning angle θr2, and inputs the deviation Δθ to the second current command value calculation unit 116. The second current command value calculation unit 116 calculates the second current command value Iref2 by PI control based on the deviation Δθ.

The second current command value calculation unit 116 may include an input limiter, a sign inverter, and an integrator that are the similar in structure as the input limiter 43, the sign inverter 44, and the integrator 46 of the first embodiment illustrated in FIG. 3. The second current command value calculation unit 116 calculates an integral value of the deviation Δθ by the integrator.

Additionally, the command value calculation unit 100 may include an integral suppression variable calculation unit 115 that is the similar in structure as the integral suppression variable calculation unit 42 of the first embodiment illustrated in FIG. 4.

Instead of the steering torque Th of the first embodiment, the deviation Δθ is input to the integral suppression variable calculation unit 115 as the operation state amount by the driver with respect to the steering mechanism.

The integral suppression variable calculation unit 115 calculates the input limit value Li. and the gradually decreasing gain Gd as the integral value of a value corresponding to the deviation Δθ, and outputs to the second current command value calculation unit 116. Note that the integral suppression variable calculation unit 115 may calculate the input limit value Li. and the gradually decreasing gain Gd according to the reaction force torque Th instead of the deviation Δθ.

The second current command value calculation unit 116 limits the deviation Δθ input to the integrator in the calculation of the integral value of the deviation Δθ according to the input limit value Li, as with the first embodiment.

Additionally, the second current command value calculation unit 116 changes a result of integration of the deviation Δθ according to the gradually decreasing gain Gd.

The first current command value Iref1 calculated by the first current command value calculation unit 113 and the second current command value Iref2 calculated by the second current command value calculation unit 116 are input to the adder 117. The adder 117 adds the first current command value Iref1 and the second current command value Iref2 to calculate the current command value Iref, and inputs to the subtractor 101 illustrated in FIG. 18.

Effects of Third Embodiment

Even in the steer-by-wire mechanism of the third embodiment, the similar effects are obtained as those in the electric power steering devices of the first embodiment and the second embodiment.

First Modification

Figure 20:
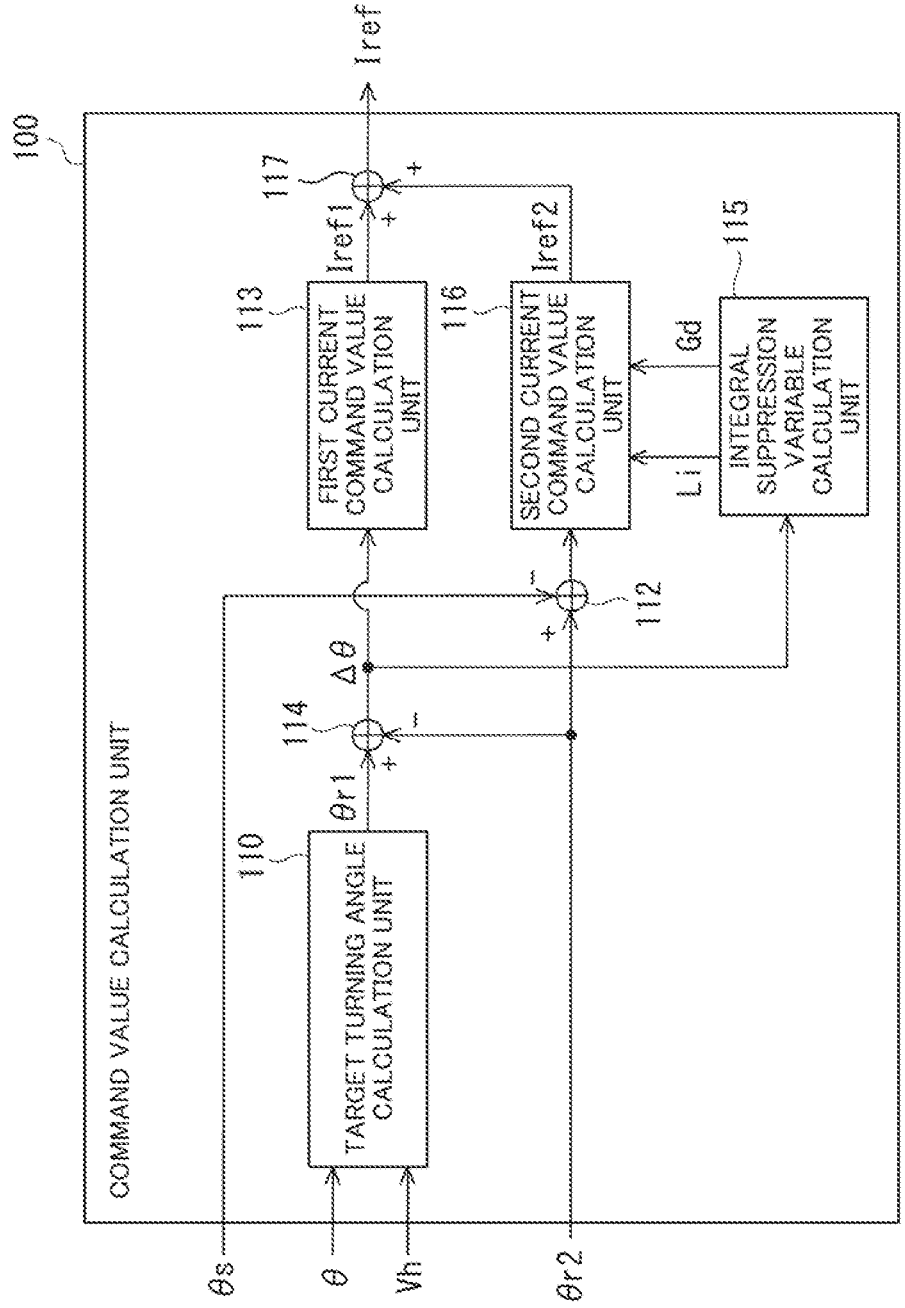
FIG. 20 is a block diagram illustrating an example of a functional structure of a command value calculation unit of a first modification of the third embodiment.

Reference will be made to FIG. 20. The subtractor 114 may calculate a difference obtained by subtracting the second target turning angle θr2 from the first target turning angle θr1 as a deviation Δθ (=θr1−θr2). The first current command value calculation unit 113 may calculate the first current command value Iref1 by PI control based on the deviation Δθ.

In addition, the subtractor 112 may calculate a deviation (θr2−θs) obtained by subtracting the actual turning angle θs from the second target turning angle θr2, and the second current command value calculation unit 116 may calculate the second current command value Iref2 by P1 control based on the deviation (θr2−θs).

Then, an increase in the integral value of the deviation (θr2−θs) may be suppressed according to the input limit value Li and the gradually decreasing gain Gd calculated according to the deviation Δθ (=θr1−θr2).

Even with this structure, the similar effects as those of the third embodiment can be obtained.

Second Modification

The second current command value Iref2 may be calculated by PI control based on an angular velocity deviation between the first target turning angle θr1 and the second target turning angle θr2 or an angular velocity deviation between the actual turning angle θs and the second target turning angle θr2.

Third Modification

In the first to third embodiments, (First Modification) and (Second Modification) of the first embodiment, and (First Modification) and (Second Modification) of the third embodiment, the input limit value Li and the gradually decreasing gain Gd may be calculated by adopting the actual steering angle θ and the actual steering angular velocity ω as the operation state amount by the driver with respect to the steering mechanism and integrating values that change according to the actual steering angle θ and the actual steering angular velocity ω.

REFERENCE SIGNS LIST

1: Steering wheel
2: Steering shaft
3: Reduction gear
4a, 4b: Universal joint
5: Pinion rack mechanism
5a: Pinion
5b: Rack
6a, 6b: Tie rod
7a, 7b: Hub unit
8L, 8R: Steered wheel
10: Torque sensor 11: Ignition key
12: Vehicle speed sensor
13: Battery
14: Steering angle sensor
20: Steering assistance motor
21, 105: Motor current detector
30: EPS-ECU
31, 100: Command value calculation unit
32, 41, 82, 84, 101, 107, 112, 114: Subtractor
33, 102: Proportional-integral control unit
34, 103: PWM control unit
35, 104: Inverter
36: State detection unit
38: Target trajectory calculation unit
39: Steering command value calculation unit
40: First assistance control value calculation unit
42: Integral suppression variable calculation unit
43: Input limiter
44: Sign inverter
45: Proportionator
46: Integrator
47, 48, 52, 55, 71, 117, 125: Adder
50: Absolute value calculation unit
51: Input limit value change amount setting unit
53: Past value holding unit
54: Gradually decreasing gain change amount setting unit
56: Past value holding unit
60: Absolute value calculation unit
61: Proportional gain setting unit
62: Increase gain setting unit
63, 64, 73: Multiplier
70: Integral gain multiplication unit
72: Past value holding unit
80: Target steering angular velocity calculation unit
81: Angular velocity calculation unit
83: Damping calculation unit
90: Backup clutch
91: Reaction force motor
92: Turning motor
93: Reduction gear
94: Pinion
95: SBW-ECU
96: Turning angle sensor
106: Reaction force target value control unit
108: Reaction force control unit
110: Target turning angle calculation unit
113: First current command value calculation unit
115: Integral suppression variable calculation unit
116: Second current command value calculation unit
120: Differentiator
121: Steering intention determination unit
124: Reduction amount setting unit

The invention claimed is:

1. An actuator control device for use in steering of a vehicle, the actuator control device comprising:
a first controller configured to calculate a turning control value that controls an actuator configured to turn a steered wheel on a basis of an operation state amount by a driver with respect to a steering mechanism of the vehicle; and
a second controller configured to set a target value of a state amount indicating a traveling direction of the vehicle on a basis of a surrounding environment of the vehicle, wherein
the first controller executes;
a target value control process to control the actuator by integral control so that an actual state amount approaches the target value; and
an integral suppression process to suppress an increase in a first integral value of a deviation $\Delta\theta$, corresponding to a difference between an actual steering angle and a target steering angle, calculated in the integral control according to a second integral value calculated according to the operation state amount.

2. The actuator control device according to claim 1, wherein in the target value control process, the first controller executes an integral control process to integrate a deviation between the actual state amount and the target value to calculate the first integral value, and control the actuator by the integral control according to the first integral value.

3. The actuator control device according to claim 2, wherein in the integral suppression process, the first controller limits the deviation integrated in the calculation of the first integral value according to the second integral value.

4. The actuator control device according to claim 2, wherein the first controller further executes a proportional control process to control the actuator by proportional control according to a proportional component of the deviation and a proportional component change process to change the proportional component according to the second integral value.

5. The actuator control device according claim 1, wherein in the integral suppression process, the first controller integrates a variable that changes according to the operation state amount to calculate the second integral value, in which a rate of change in the variable with respect to the operation state amount that is equal to or more than a threshold value is larger than a rate of change in the variable with respect to the operation state amount that is below the threshold value.

6. The actuator control device according to claim 5, wherein in the integral suppression process, the first controller determines the driver's intention of steering, and reduces a value of the variable when there is the intention of steering and the variable is a positive value to less than a value of the variable when there is not the intention of steering and the variable is a positive value.

7. The actuator control device according to claim 6, wherein in the integral suppression process, the first controller determines the driver's intention of steering according to a change speed of a steering torque that is the operation state amount.

8. The actuator control device according to claim 5, wherein in the integral suppression process, the first controller reduces a value of the variable according to a change speed of a steering torque that is the operation state amount.

9. The actuator control device according to claim 1, wherein in the integral suppression process, the first controller changes a result of the integration of the first integral value according to the second integral value.

10. An actuator control device, for use in steering of a vehicle, the actuator control device comprising:
a first controller configured to calculate a turning control value that controls an actuator configured to turn a steered wheel on a basis of an operation state amount by a driver with respect to a steering mechanism of the vehicle; and
a second controller configured to set a target value of a state amount indicating a traveling direction of the vehicle on a basis of a surrounding environment of the vehicle, wherein
the first controller executes;

a target value control process to control the actuator by integral control so that an actual state amount approaches the target value; and an integral suppression process to suppress an increase in a first integral value calculated in the integral control according to a second integral value calculated according to the operation state amount, and wherein in the target value control process, the first controller executes a target change speed calculation process to calculate a target change speed of the state amount on a basis of a difference between the actual state amount and the target value and an integral control process to integrate a deviation between a change speed of the actual state amount and the target change speed to calculate the first integral value, and control the actuator by the integral control according to the first integral value.

\* \* \* \* \*